United States Patent
Lin et al.

(10) Patent No.: US 8,971,400 B2
(45) Date of Patent: Mar. 3, 2015

(54) METHOD FOR PERFORMING HYBRID MULTIHYPOTHESIS PREDICTION DURING VIDEO CODING OF A CODING UNIT, AND ASSOCIATED APPARATUS

(75) Inventors: Jian-Liang Lin, Yilan County (TW); Yu-Pao Tsai, Kaohsiung (TW); Shaw-Min Lei, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 339 days.

(21) Appl. No.: 13/048,893

(22) Filed: Mar. 16, 2011

(65) Prior Publication Data

US 2012/0063514 A1    Mar. 15, 2012

Related U.S. Application Data

(60) Provisional application No. 61/323,948, filed on Apr. 14, 2010.

(51) Int. Cl.
*H04N 7/12*      (2006.01)
*H04N 19/51*     (2014.01)
*H04N 19/583*    (2014.01)
(Continued)

(52) U.S. Cl.
CPC ... *H04N 19/00715* (2013.01); *H04N 19/00727* (2013.01); *H04N 19/00884* (2013.01); *H04N 19/0066* (2013.01); *H04N 19/00636* (2013.01); *H04N 19/00618* (2013.01)
USPC ............................................ 375/240; 348/43

(58) Field of Classification Search
USPC ...................................................... 375/240
See application file for complete search history.

(56) References Cited

U.S. PATENT DOCUMENTS 6,807,231 B1    10/2004  Wiegand
7,236,634 B2 *   6/2007  Miyakoshi et al. ........... 382/236
(Continued)

FOREIGN PATENT DOCUMENTS

TW        200837663         9/2008

OTHER PUBLICATIONS

Markus Flierl et al., Multihypothesis Motion Pictures for H.26L, Video Coding Experts Group, ITU-T SG.16, Jan. 9-12, 2001, pp. 1-8, XP030003169, Eibsee, Germany.
(Continued)

*Primary Examiner* — Sath V Perungavoor
*Assistant Examiner* — Howard D Brown, Jr.
(74) *Attorney, Agent, or Firm* — Winston Hsu; Scott Margo

(57) ABSTRACT

A method for performing hybrid multihypothesis prediction during video coding of a coding unit includes: processing a plurality of sub-coding units in the coding unit; and performing motion vector derivation of a portion of the sub-coding units. More particularly, the step of performing motion vector derivation of the portion of the sub-coding units further includes: deriving a plurality of motion vectors for multihypothesis motion-compensated prediction of a specific sub-coding unit of the portion of the sub-coding units from at least one other sub-coding/coding unit or by performing motion estimation. The method further includes performing multihypothesis motion-compensated prediction on the specific sub-coding unit according to the plurality of motion vectors, and more particularly, includes utilizing a linear combination of a plurality of pixel values derived from the plurality of motion vectors as a predicted pixel value of the specific sub-coding unit. An associated apparatus is also provided.

28 Claims, 19 Drawing Sheets

(51) Int. Cl.
*H04N 19/70* (2014.01)
*H04N 19/56* (2014.01)
*H04N 19/547* (2014.01)
*H04N 19/54* (2014.01)
*H04N 11/02* (2006.01)

(56) References Cited

U.S. PATENT DOCUMENTS

| | | | | |
|---|---|---|---|---|
| 7,599,438 | B2* | 10/2009 | Holcomb et al. | 375/240.23 |
| 8,085,845 | B2* | 12/2011 | Tourapis et al. | 375/240.16 |
| 8,457,203 | B2* | 6/2013 | Bossen et al. | 375/240.15 |
| 2006/0268166 | A1* | 11/2006 | Bossen et al. | 348/390.1 |
| 2011/0255598 | A1* | 10/2011 | Lin et al. | 375/240.16 |
| 2011/0255600 | A1* | 10/2011 | Lin et al. | 375/240.16 |
| 2011/0310956 | A1* | 12/2011 | Lin et al. | 375/240.02 |
| 2014/0139627 | A1* | 5/2014 | Chen et al. | 348/43 |

OTHER PUBLICATIONS

Markus Flierl et al., Rate-Constrained Multihypothesis Prediction for Motion-Compensated Video Compression, IEEE Transactions on Circuits and Systems for Video Technology, Nov. 2002, pp. 957-969, XP002694274, vol. 12. No. 11, IEEE, NY, US.

* cited by examiner

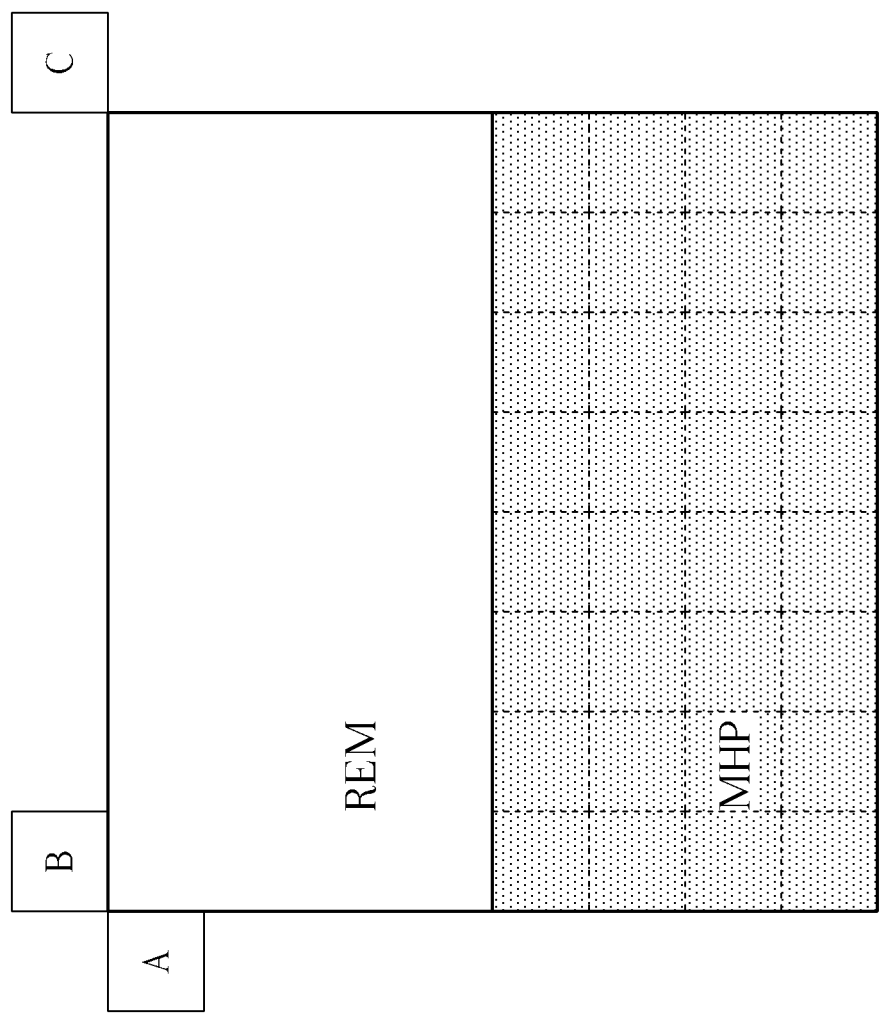

METHOD FOR PERFORMING HYBRID MULTIHYPOTHESIS PREDICTION DURING VIDEO CODING OF A CODING UNIT, AND ASSOCIATED APPARATUS

CROSS REFERENCE TO RELATED APPLICATIONS

This application claims the benefit of U.S. provisional application No. 61/323,948, which was filed on Apr. 14, 2010 and entitled "MULTIHYPOTHESIS PREDICTION IN VIDEO CODING" and is incorporated herein by reference.

BACKGROUND

The present invention relates to video processing regarding motion compensation, and more particularly, to a method for performing hybrid multihypothesis prediction during video coding of a coding unit, and to an associated apparatus.

Motion estimation/compensation is a technique utilized in encoding and decoding of video data for video compression. With the aid of motion estimation/compensation, a current picture can be represented in terms of some portions of one or more reference pictures, where the reference pictures may be previous in time or even from the future. Typically, images can be accurately synthesized from previously transmitted/stored images through motion compensation, and the compression efficiency can be improved. As the coding techniques progresses, the designs regarding newer standards have been introduced to further improve the compression efficiency.

SUMMARY

It is therefore an objective of the claimed invention to provide a method for performing hybrid multihypothesis prediction during video coding of a coding unit, and to provide an associated apparatus, in order to improve the compression efficiency of video processing.

An exemplary embodiment of a method for performing hybrid multihypothesis prediction during video coding of a coding unit comprises: processing a plurality of sub-coding units in the coding unit; and performing motion vector derivation of a portion of the sub-coding units. More particularly, the step of performing motion vector derivation of the portion of the sub-coding units further comprises: deriving a plurality of motion vectors for multihypothesis motion-compensated prediction of a specific sub-coding unit of the portion of the sub-coding units from at least one other sub-coding/coding unit. In addition, the method further comprises performing multihypothesis motion-compensated prediction on the specific sub-coding unit according to the plurality of motion vectors, where the step of performing multihypothesis motion-compensated prediction on the specific sub-coding unit according to the plurality of motion vectors further comprises utilizing a linear combination of a plurality of pixel values derived from the plurality of motion vectors as a predicted pixel value of the specific sub-coding unit.

An exemplary embodiment of an apparatus for performing hybrid multihypothesis prediction during video coding of a coding unit comprises a processing circuit arranged to perform video coding on the coding unit, where the processing circuit comprises a preprocessing module and at least one coding module. The preprocessing module is arranged to process a plurality of sub-coding units in the coding unit and perform motion vector derivation of a portion of the sub-coding units. More particularly, the preprocessing module derives a plurality of motion vectors for multihypothesis motion-compensated prediction of a specific sub-coding unit of the portion of the sub-coding units from at least one other sub-coding/coding unit, and performs multihypothesis motion-compensated prediction on the specific sub-coding unit according to the plurality of motion vectors, where the preprocessing module utilizes a linear combination of a plurality of pixel values derived from the plurality of motion vectors as a predicted pixel value of the specific sub-coding unit. In addition, the at least one coding module is arranged to perform video coding on the coding unit based upon the multihypothesis motion-compensated prediction performed by the preprocessing module.

An exemplary embodiment of a method for performing hybrid multihypothesis prediction during video coding of a coding unit comprises: processing a plurality of sub-coding units in the coding unit; and performing motion vector derivation of a portion of the sub-coding units. More particularly, the step of performing motion vector derivation of the portion of the sub-coding units further comprises deriving a plurality of motion vectors for multihypothesis motion-compensated prediction of a specific sub-coding unit of the portion of the sub-coding units by performing motion estimation. In addition, the method further comprises performing multihypothesis motion-compensated prediction on the specific sub-coding unit according to the plurality of motion vectors, where the step of performing multihypothesis motion-compensated prediction on the specific sub-coding unit according to the plurality of motion vectors further comprises utilizing a linear combination of a plurality of pixel values derived from the plurality of motion vectors as a predicted pixel value of the specific sub-coding unit.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 8A-8B illustrate exemplary sources for obtaining at least one motion vector of a remaining portion that differs from the portion of the sub-coding units involved with the method shown in FIG. 2 according to some embodiments of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1A:
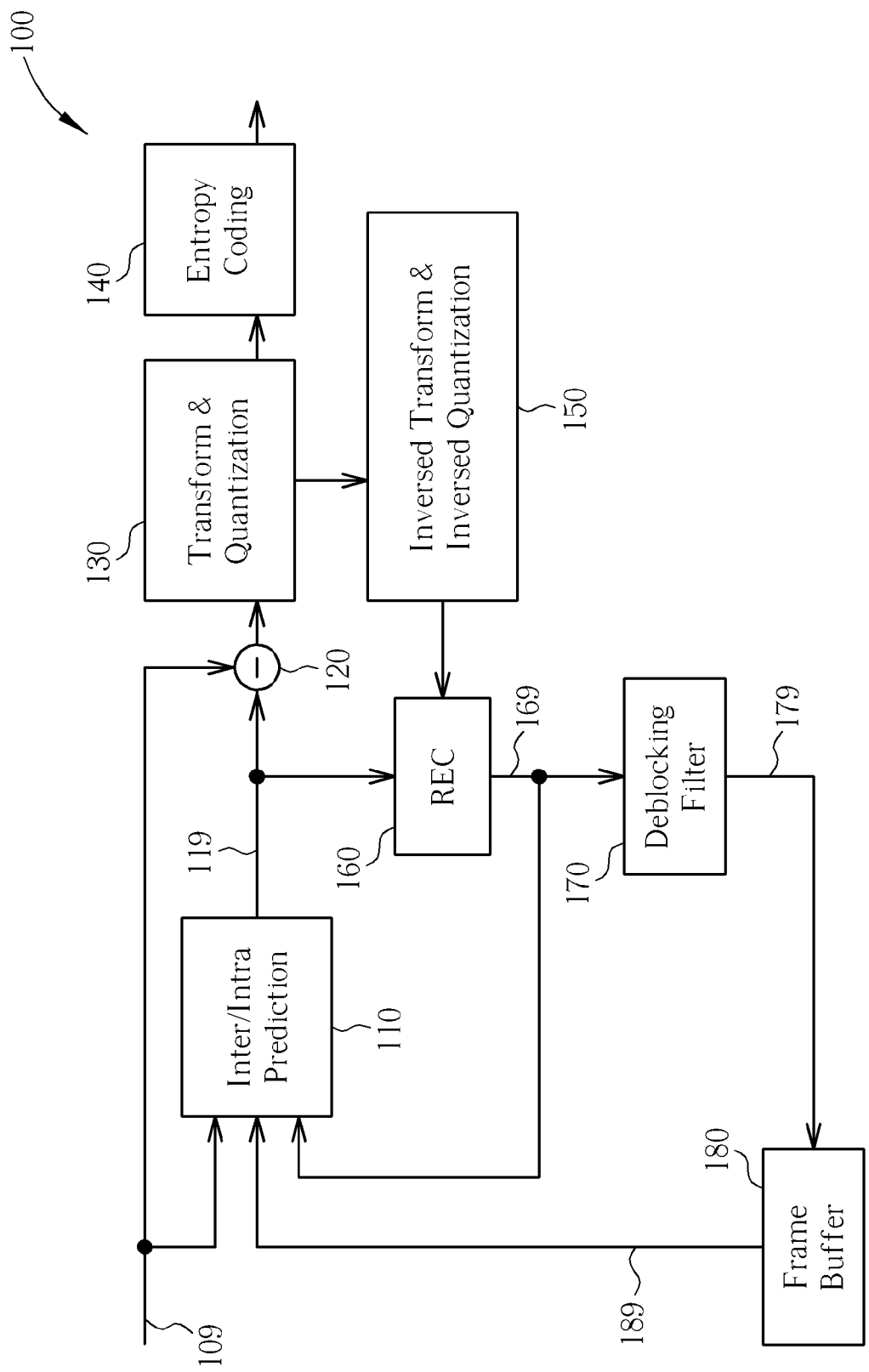
FIG. 1A is a diagram of an apparatus for performing hybrid multihypothesis prediction during video coding of a coding unit according to a first embodiment of the present invention.
Figure 1B:
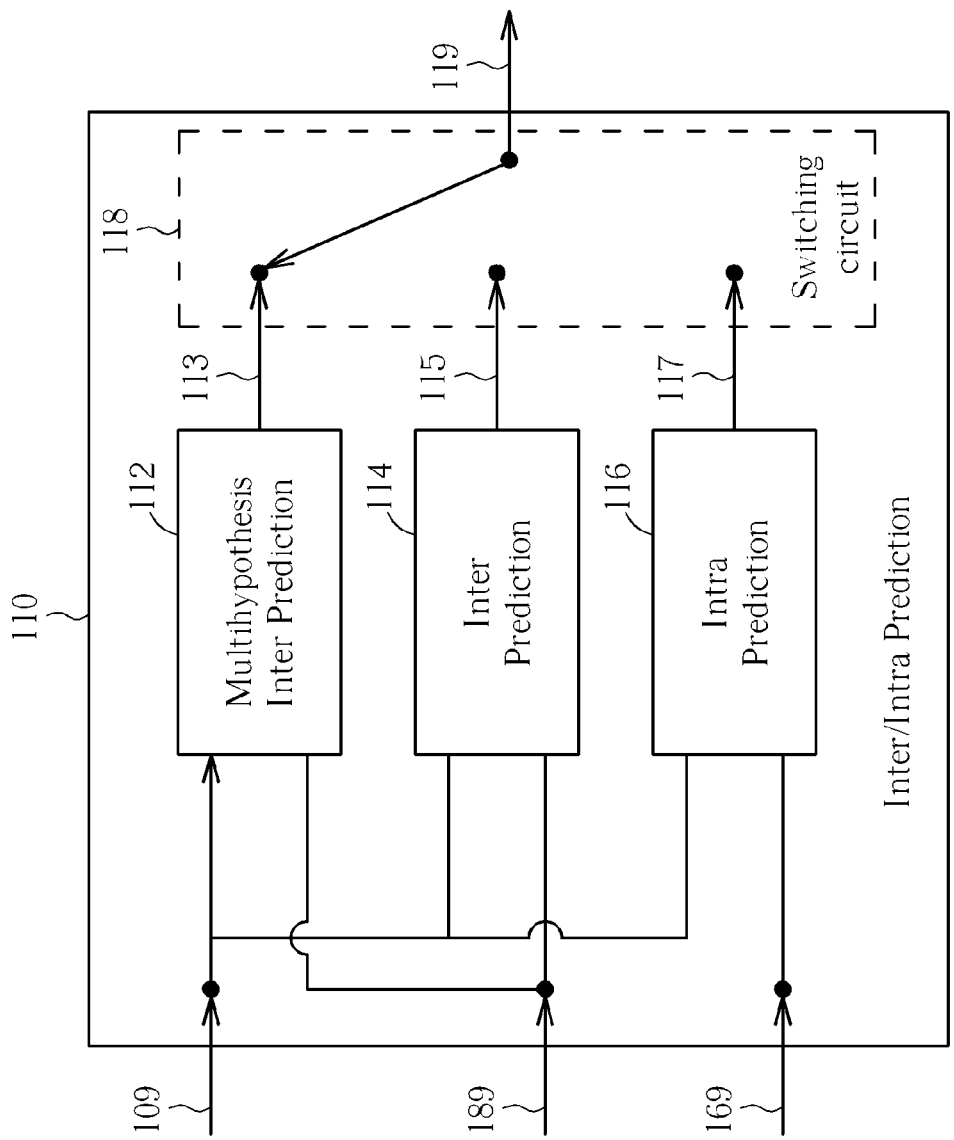
FIG. 1B illustrates the inter/intra prediction module 110 shown in FIG. 1A according to an embodiment of the present invention.

Please refer to FIG. 1A, which illustrates a diagram of an apparatus 100 for performing hybrid multihypothesis prediction during video coding of a coding unit according to a first embodiment of the present invention. The apparatus 100 comprises an inter/intra prediction module 110 (labeled "Inter/Intra Prediction" in FIG. 1A), an arithmetic unit 120, a transform and quantization module 130 (labeled "Transform & Quantization" in FIG. 1A), an entropy coding circuit 140 (labeled "Entropy Coding" in FIG. 1A), an inversed transform and inversed quantization module 150 (labeled "Inversed Transform & Inversed Quantization" in FIG. 1A), a reconstruction circuit 160 (labeled "REC" in FIG. 1A), a deblocking filter 170, and a frame buffer 180. Referring to FIG. 1B, the inter/intra prediction module 110 mentioned above may comprise a multihypothesis inter prediction circuit 112 (labeled "Multihypothesis Inter Prediction" in FIG. 1B), an inter prediction circuit 114 (labeled "Inter Prediction" in FIG. 1B), an intra prediction circuit 116 (labeled "Intra Prediction" in FIG. 1B), and a switching circuit 118.

According to the embodiment shown in FIG. 1A, the apparatus 100 can perform video encoding on an original signal 109, in order to generate an output signal carrying coding results, such as the output of the entropy coding circuit 140. For example, the original signal 109 may represent input video carrying data of the coding unit, and the output of the entropy coding circuit 140 can be an output bitstream (or bit stream). In addition, the inter/intra prediction module 110 is arranged to perform inter/intra prediction, and more particularly, to perform multihypothesis inter prediction, inter prediction, and intra prediction by utilizing the multihypothesis inter prediction circuit 112, the inter prediction circuit 114, and the intra prediction circuit 116 shown in FIG. 1B, respectively.

As shown in FIG. 1A, the arithmetic unit 120 is arranged to perform an arithmetic operation such as a subtraction operation on the original signal 109 (which may represent the input video carrying data of the coding unit, for example) and the prediction signal 119 generated by the inter/intra prediction module 110. In addition, the transform and quantization module 130, the entropy coding circuit 140, the inversed transform and inversed quantization module 150, and the reconstruction circuit 160 are arranged to perform transform and quantization, entropy coding, inversed transform and inversed quantization, and reconstruction operations, respectively. As a result, the reconstruction circuit 160 generates a reconstructed signal 169 carrying reconstructed results of the reconstruction operations. Additionally, the deblocking filter 170 is arranged to perform deblocking filtering on the reconstructed signal 169, in order to generate a deblocked signal 179 carrying deblocked video data for being temporarily stored into the frame buffer 180, and the inter/intra prediction module 110 is capable of accessing the deblocked video data carried by a restored signal 189 from the frame buffer 180. This is for illustrative purposes only, and is not meant to be a limitation of the present invention. According to some variations of this embodiment, in a situation where the deblocking filter 170 and the deblocking filtering thereof can be omitted, the reconstructed results carried by the reconstructed signal 169 can be temporarily stored in the frame buffer 180, and the inter/intra prediction module 110 is capable of accessing the reconstructed results through the restored signal 189.

Referring to FIG. 1B, the multihypothesis inter prediction circuit 112 is arranged to perform multihypothesis inter prediction according to the original signal 109 and the restored signal 189 to generate a multihypothesis inter prediction output 113, the inter prediction circuit 114 is arranged to perform inter prediction according to the original signal 109 and the restored signal 189 to generate an inter prediction output 115, and the intra prediction circuit 116 is arranged to perform intra prediction according to the original signal 109 and the reconstructed signal 169 to generate an intra prediction output 117, where the switching circuit 118 is arranged to dynamically select one of the multihypothesis inter prediction output 113, the inter prediction output 115, and the intra prediction output 117 as the prediction signal 119 mentioned above.

In practice, at least a portion (e.g. a portion or all) of the apparatus 100 can be implemented by utilizing hardware circuits. For example, the apparatus 100 can be implemented with a processing circuit arranged to perform video coding on the coding unit, where the processing circuit may comprise a preprocessing module comprising the inter/intra prediction module 110, and may further comprise at least one coding module comprising the arithmetic unit 120, the transform and quantization module 130, the entropy coding circuit 140, the inversed transform and inversed quantization module 150, the reconstruction circuit 160, and the deblocking filter 170. More particularly, one or more components of the apparatus 100 can be implemented with digital signal processing techniques. This is for illustrative purposes only, and is not meant to be a limitation of the present invention. According to some variations of this embodiment, at least a portion of the apparatus 100 can be implemented by utilizing at least one program module. For example, the processing circuit can be a processor executing a plurality of program modules, where the processor executing a first portion of program modules can perform the same or similar operations of the preprocessing module mentioned above, and the processor executing a second portion of program modules can perform the same or similar operations of the coding module mentioned above.

No matter whether at least a portion (e.g. a portion or all) of the apparatus 100 is implemented by utilizing hardware circuits or by utilizing at least one program module, the apparatus 100 is capable of performing video coding in units of coding units. For example, the coding units can be 16×16 macroblocks (MBs). In another example, the coding units can be coding units of a specific size, where the specific size may be determined in advance, and it is unnecessary that the specific size is equivalent to that of the macroblocks. During processing one of the coding units of at least one image, such as the aforementioned coding unit, predicting one or more motion vectors for the coding unit may be required. In a situation where the coding format is complicated, in order to achieve high performance of coding (e.g. encoding or decoding), it is suggested not to extravagantly spend too much time on digging into calculations of some motion vectors that are required in a preprocessing phase before main coding processing. According to this embodiment, the preprocessing module mentioned above is capable of dividing the aforementioned coding unit into a plurality of sub-coding units (e.g. various kinds of partitions within the coding unit, such as square or non-square partitions) and is capable of performing motion vector derivation of a portion of the sub-coding units. More particularly, the preprocessing module can derive a plurality of motion vectors for multihypothesis motion-compensated prediction of a specific sub-coding unit of the portion of the sub-coding units from at least one other sub-coding/coding unit (and more particularly, at least one coded sub-coding/coding unit), and perform multihypothesis motion-compensated prediction on the specific sub-coding unit according to the aforementioned motion vectors, where the preprocessing module utilizes a linear combination of a plurality of pixel values derived from the aforementioned motion vectors as a predicted pixel value of the specific sub-coding unit. In addition, the aforementioned at least one coding module is arranged to perform video coding on the coding unit based upon the multihypothesis motion-compensated prediction performed by the preprocessing module.

Figure 1C:
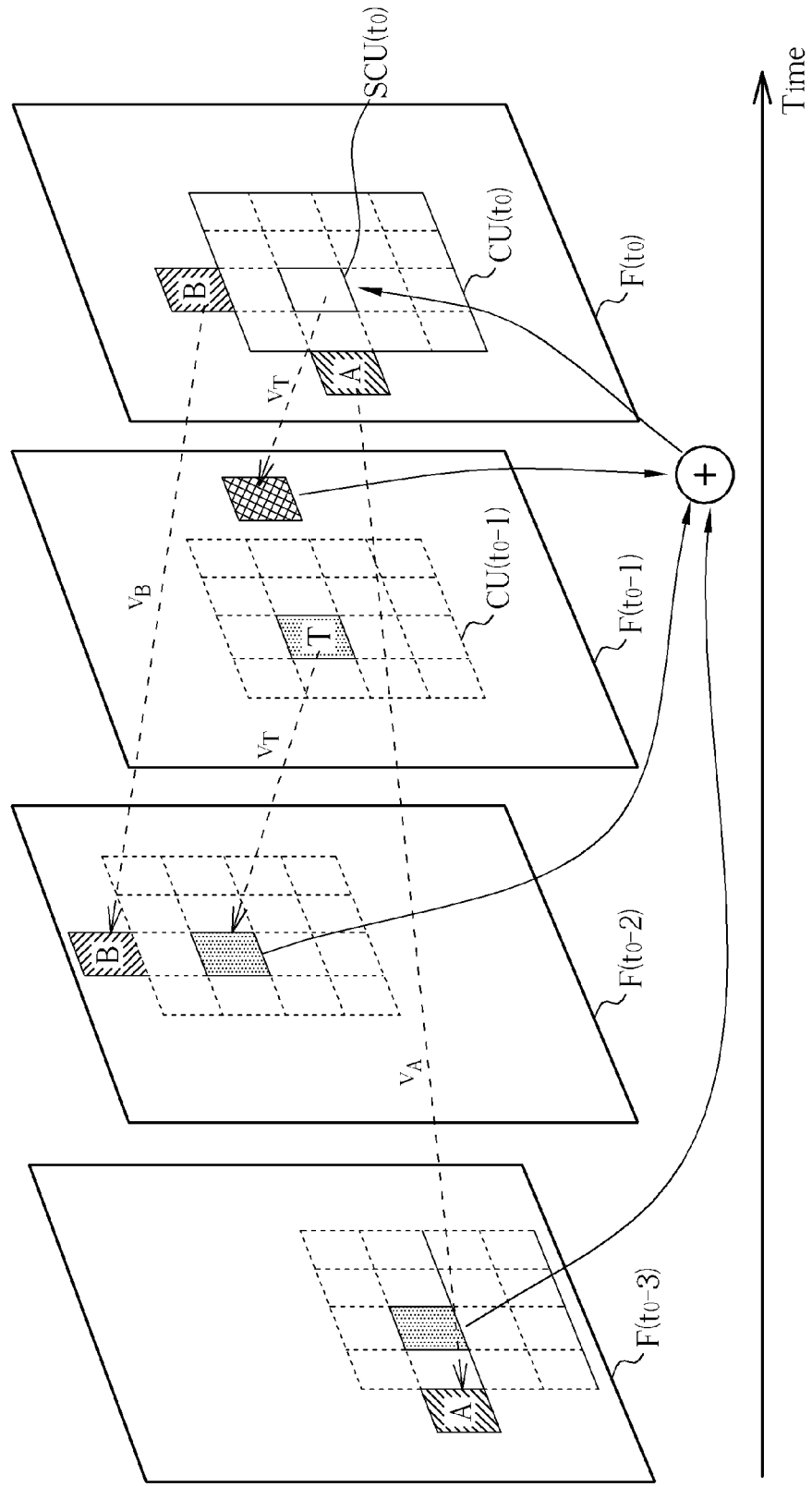
FIG. 1C illustrates exemplary multihypothesis motion-compensated prediction operations of the inter/intra prediction module shown in FIG. 1A according to an embodiment of the present invention.

FIG. 1C illustrates exemplary multihypothesis motion-compensated prediction operations of the inter/intra prediction module 110 shown in FIG. 1A according to an embodiment of the present invention. In this embodiment, a set of notations $F(t_0-3)$, $F(t_0-2)$, $F(t_0-1)$, and $F(t_0)$ represents a portion of a plurality of subsequent frames $\{F(t)\}$, with the frame $F(t_0)$ being the current frame. The current frame $F(t_0)$ comprises a plurality of coding units $\{CU(t_0)\}$, and a coding unit $CU(t_0)$ may comprise a plurality of sub-coding units $\{SCU(t_0)\}$, where the notation $v_k$ may represent one of the aforementioned motion vectors for multihypothesis motion-compensated prediction of the specific sub-coding unit such as the sub-coding unit $SCU(t_0)$ shown in FIG. 1C. Thus, the preprocessing module mentioned above respectively obtains the motion vectors $\{v_k\}$ from at least one other sub-coding/coding unit (e.g. one or more other sub-coding/coding units), which means the preprocessing module utilizes the motion vectors of the at least one other sub-coding/coding unit as the motion vectors $\{v_k\}$ for multihypothesis motion-compensated prediction of the specific sub-coding unit. According to this embodiment, the preprocessing module can perform multihypothesis motion-compensated prediction on the specific sub-coding unit such as the sub-coding unit $SCU(t_0)$ shown in FIG. 1C according to the plurality of motion vectors $\{v_k\}$.

In general, the preprocessing module can utilize a linear combination of a plurality of pixel values derived from the aforementioned motion vectors, such as the reference pixel values $\{\Psi_r\}$ of some reference pixels, as a predicted pixel value $\Psi_p$ of the specific sub-coding unit, and more particularly, the predicted pixel value $\Psi_p$ of a specific predicted pixel within the specific sub-coding unit. Please note that the linear combination can be a weighted summation of the plurality of pixel values, which means the preprocessing module calculates the weighted summation of the plurality of pixel values to derive the predicted pixel value of the specific sub-coding unit. For example, in a situation where the specific predicted pixel having the predicted pixel value $\Psi_p$ belongs to the $i^{th}$ sub-coding unit (e.g. the sub-coding unit $SCU(t_0)$ shown in FIG. 1C) and is located at the position x (e.g. a vector indicating the position, such as a two dimensional vector on the image plane of the current frame $F(t_0)$), the predicted pixel value $\Psi_p$ can be rewritten as $\Psi_p(i, x)$, and the predicted pixel value $\Psi_p(i, x)$ can be express as follows:

$$\Psi_p(i,x)=\Sigma_{k \in K}(h_k(i,x)\Psi_r(x+v_k));$$

where the index k may vary within the set K, with the notation $h_k(i, x)$ representing a weighted parameter associated to the index k. For example, in a situation where the number of possible values of k is greater than one, the summation of the weighted parameters $\{h_k(i, x)\}$ can be equal to one, for simplicity.

As shown in FIG. 1C, in a situation where any two of respective weighted parameters for pixel values are equal to each other, the motion vectors $\{v_k\}$ may comprise the motion vectors $v_A$ and $v_B$ of sub-coding units A and B of other coding unit(s) within the current frame $F(t_0)$ and the motion vector $v_T$ of a sub-coding unit T of a coding unit $CU(t_0-1)$ within another frame such as the previous frame $F(t_0-1)$. More particularly, the aforementioned other coding unit (or sub-coding unit) within the current frame $F(t_0)$ is a coded coding unit (or sub-coding unit) or a motion compensated coding unit/sub-coding unit. For example, in a situation where the coding units are blocks, the coding unit $CU(t_0-1)$ can be a collocated block with respect to the coding unit $CU(t_0)$. As a result, by applying the weighted parameters $\{h_k(i, x)\}$ to the reference pixel values $\{\Psi_r\}$, the preprocessing module can blend/mix the partial images indicated by the motion vectors $\{v_k\}$ such as $v_A$, $v_B$, and $v_T$ in order to generate a weighted summation image, and utilize the weighted summation image as the predicted partial image of the specific sub-coding unit such as the sub-coding unit $SCU(t_0)$ shown in FIG. 1C. This is for illustrative purposes only, and is not meant to be a limitation of the present invention. According to a variation of this embodiment, the preprocessing module can calculate an average of the plurality of pixel values to derive the predicted pixel value $\Psi_p$ of the specific sub-coding unit, which means any two of the weighted parameters $\{h_k(i, x)\}$ are equal to each other. Please refer to FIG. 2 for further details regarding the above-disclosed operations.

Figure 2:
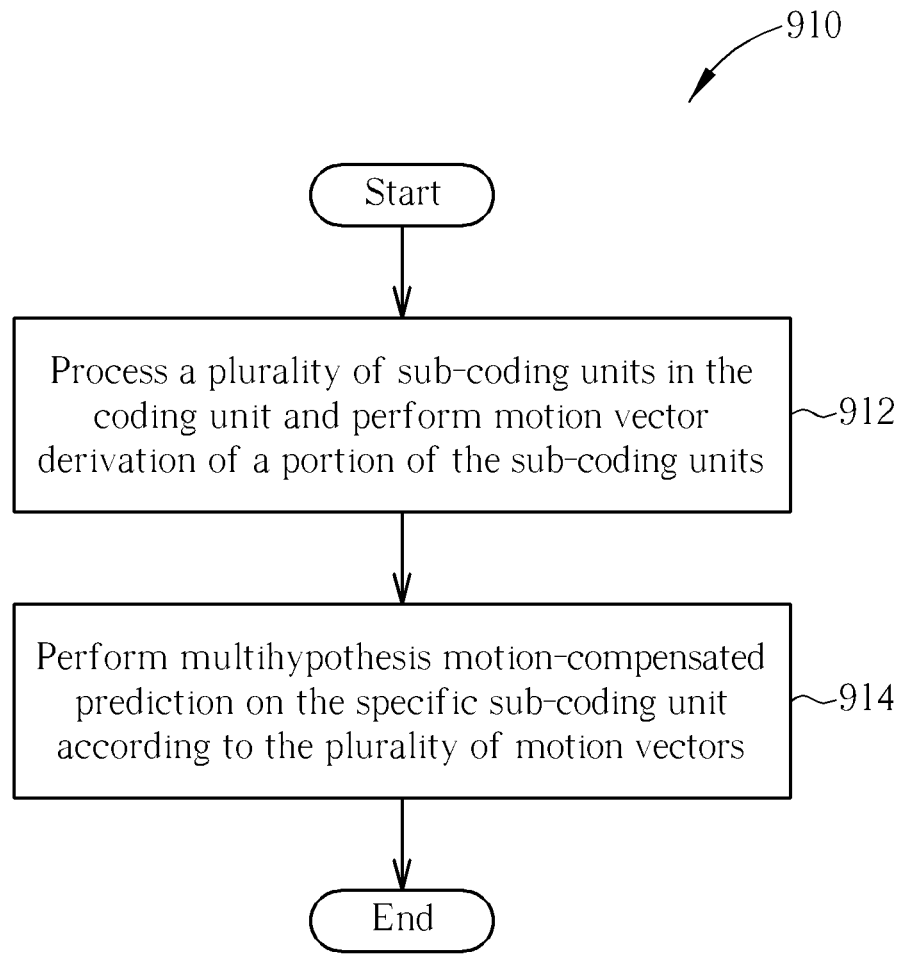
FIG. 2 is a flowchart of a method for performing hybrid multihypothesis prediction during video coding of a coding unit according to an embodiment of the present invention.

FIG. 2 is a flowchart of a method 910 for performing hybrid multihypothesis prediction during video coding of a coding unit according to an embodiment of the present invention. The method 910 can be applied to the apparatus 100 shown in FIG. 1A, and more particularly, to the processing circuit mentioned above. The method is described as follows.

Figure 3:
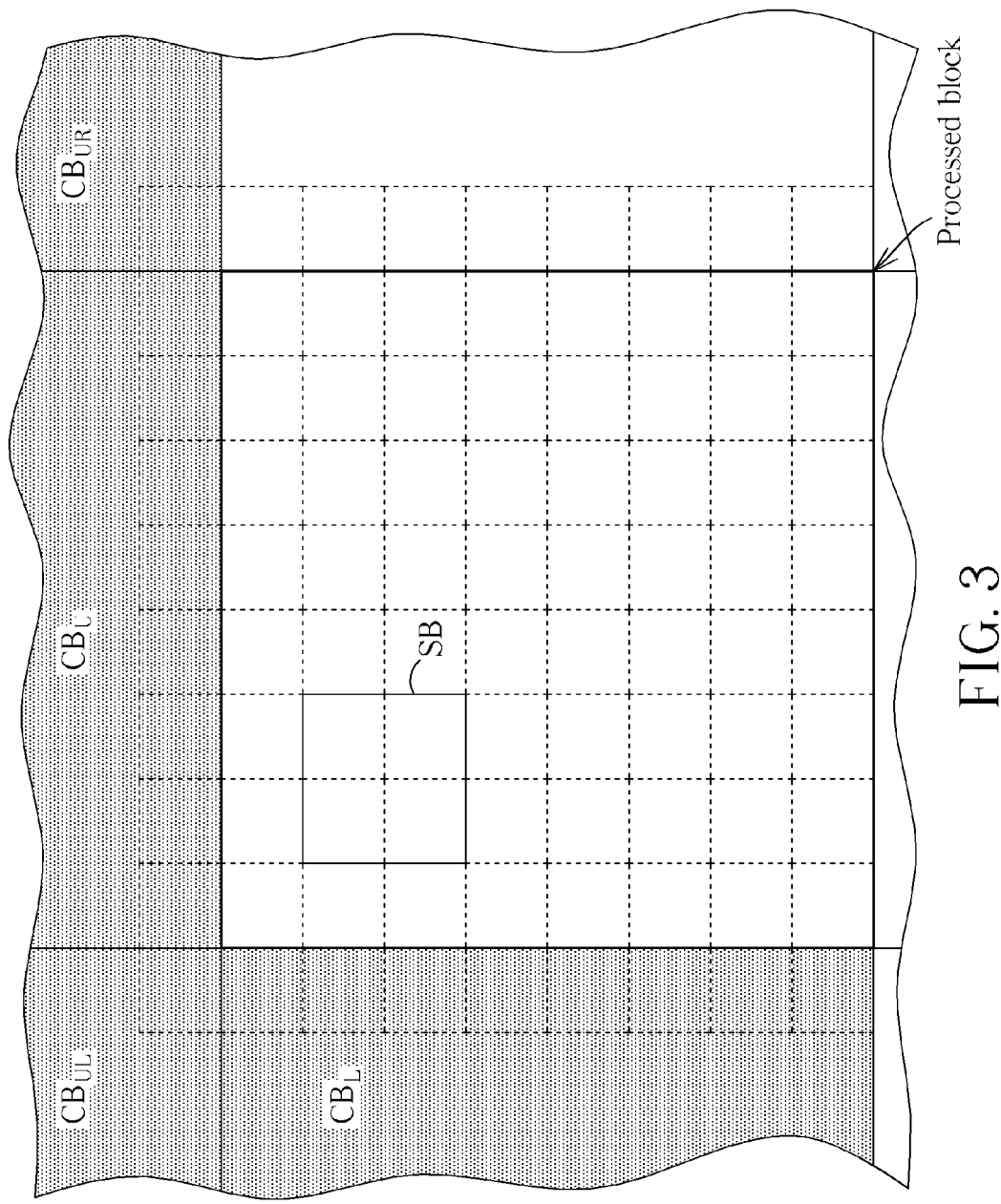
FIG. 3 illustrates exemplary coded blocks involved with the method shown in FIG. 2 according to an embodiment of the present invention.

In Step 912, the preprocessing module mentioned above processes a plurality of sub-coding units such as the sub-coding units $\{SCU(t_0)\}$ in the coding unit $CU(t_0)$ (e.g. the coding unit under consideration) and performs motion vector derivation of a portion of the sub-coding units $\{SCU(t_0)\}$ (e.g. the aforementioned portion of the sub-coding units). In particular, the preprocessing module derives a plurality of motion vectors, such as the motion vectors $\{v_k\}$ disclosed above, for multihypothesis motion-compensated prediction of the specific sub-coding unit $SCU(t_0)$ of the portion of the sub-coding units $\{SCU(t_0)\}$ from one or more other sub-coding/coding units. According to an embodiment of the present invention, such as that shown in FIG. 3, the coding unit $CU(t_0)$ can be a block under processing (labeled "Processed block" in FIG. 3), and the specific sub-coding unit $SCU(t_0)$ can be a sub-block SB, where the shaded portions illustrated in FIG. 3 may represent at least a portion of coded blocks $\{CB\}$. Referring to FIG. 3, the coded blocks $\{CB\}$ may comprise a left coded block $CB_L$, an upper left coded block $CB_{UL}$, an upper coded block $CB_U$, and an upper right coded block $CB_{UR}$. For example, the motion vectors $\{v_k\}$ may comprise motion vectors of at least a portion (e.g. a portion or all) of the coded blocks $\{CB\}$, such as one or more of the coded blocks $CB_L$, $CB_{UL}$, $CB_U$, and $CB_{UR}$. In some other examples, the preprocessing unit processes a plurality of sub-coding units such as a left sub-coding unit and a right sub-coding unit of the coding unit, or an upper sub-coding unit and a lower sub-coding unit of the coding unit. The preprocessing unit derives a plurality of motion vectors for multihypothesis motion-compensated prediction of the left sub-coding unit/right sub-coding unit/upper sub-coding unit/lower sub-coding unit from at least one other sub-coding/coding unit. The at least one other sub-coding/coding unit may be spatial sub-coding/coding unit (e.g. a sub-coding unit of a neighboring coding unit) or a temporal sub-coding/coding unit (e.g. a collocated sub-coding/coding unit). The above mentioned motion vectors may be derived from a single sub-coding/coding unit, for example, the motion vectors are list 0 motion vector and list 1 motion vector of the same sub-coding unit of a neighboring coding unit. The preprocessing module may perform motion vector derivation of the portion of the sub-coding units based on an explicit flag. For example, the motion vector(s) of a particular spatial sub-coding unit is selected for multihypothesis motion compensated prediction of the specific sub-coding unit according to the explicit flag.

In Step 914, the aforementioned preprocessing module performs multihypothesis motion-compensated prediction on the specific sub-coding unit $SCU(t_0)$ according to the plurality of motion vectors $\{v_k\}$. In particular, the preprocessing module utilizes a linear combination of a plurality of pixel values derived from the motion vectors $\{v_k\}$, such as the linear combination of the reference pixel values $\{\Psi_r\}$ of the reference pixels, as the predicted pixel value $\Psi_p$ of the specific sub-coding unit. For example, each coding unit (e.g. the coding unit $CU(t_0)$) can be a block, and more particularly, a block comprising an array of pixels, such as an extended macroblock, a macroblock, or a portion of a macroblock. Thus, a sub-coding unit can be referred to as a sub-block. According to an embodiment of the present invention, such as that shown in FIG. 3, the aforementioned preprocessing module can perform multihypothesis motion-compensated prediction on the block under processing (labeled "Processed block" in FIG. 3) according to the motion vectors $\{v_k\}$ disclosed above, where the preprocessing module can blend/mix the reference pixel values $\{\Psi_r\}$ derived from the motion vectors of at least a portion (e.g. a portion or all) of the coded blocks $\{CB\}$, such as one or more of the coded blocks $CB_L$, $CB_{UL}$, $CB_U$, and $CB_{UR}$. In this embodiment, the coded blocks $\{CB\}$ can be motion-compensated blocks.

Please note that, according to an embodiment of the present invention, such as a variation of the embodiment shown in FIG. 2, the order of performing operations of Step 912 and Step 914 shown in FIG. 2 can be altered. For example, in order to perform video coding in accordance with some new coding standard(s), the operation of Step 914 can be performed first, and then the operation of Step 912 can be performed.

According to a variation of the embodiment shown in FIG. 2, in Step 912, the preprocessing module obtains the plurality of motion vectors $\{v_k\}$ for multihypothesis motion compensated prediction of the aforementioned specific sub-coding unit $SCU(t_0)$ by performing motion estimation. In addition, in Step 914, the preprocessing module can further utilize a linear combination of a plurality of pixel values $\{\Psi_r\}$ associated to the plurality of motion vectors $\{v_k\}$ as the predicted pixel value $\Psi_p$ of the specific sub-coding unit $SCU(t_0)$. For example, in a situation where the specific predicted pixel having the predicted pixel value $\Psi_p$ is located at the position x (e.g. a vector indicating the position, such as a two dimensional vector on the image plane of the current frame $F(t_0)$), the predicted pixel value $\Psi_p$ can be rewritten as $\Psi_p(x)$, and the predicted pixel value $\Psi_p(x)$ can be express as follows:

$$\Psi_p(x) = \Sigma_{k \in K}(h_k(x)\Psi_r(x+v_k)) + h_0(x)\Psi_r(x+v_0);$$

where the index k may vary within the set K, with the notation $h_k(x)$ representing the weighted parameter associated to the index k, and the estimated motion vector $v_0$ is the motion vector to be estimated during motion estimation, with the notation $h_0(x)$ representing the weighted parameter associated to the suffix 0 of the estimated motion vector $v_0$.

For example, the preprocessing module of this variation can optimize the estimated motion vector $v_0$ by finding the best status among other possible statuses of the estimated motion vector $v_0$. Thus, the linear combination of this variation can be the weighted summation $\Sigma_{k \in K} (h_k(x) \Psi_r(x+v_k)) + h_0(x) \Psi_r(x+v_0)$ with the estimated motion vector $v_0$ having been obtained, and therefore, the preprocessing module can utilize the weighted summation $\Sigma_{k \in K} (h_k(x) \Psi_r(x+v_k)) + h_0(x) \Psi_r(x+v_0)$ as the predicted pixel value $\Psi_p$ of the specific sub-coding unit $SCU(t_0)$. Similar descriptions are not repeated in detail for this variation.

In some embodiments such as variations of the embodiment shown in FIG. 3, the other sub-coding/coding unit mentioned in Step 912 is a coded sub-coding/coding unit. For example, in a portion of these variations, the other sub-coding/coding unit mentioned in Step 912 comprises at least one spatially coded sub-coding/coding unit (e.g. one or more of the coded blocks $\{CB\}$ in the current frame $F(t_0)$, or one or more coded sub-blocks within the block under processing) and/or at least one temporally coded sub-coding/coding unit (e.g. one or more coded sub-blocks/blocks in another frame that differs from the current frame $F(t_0)$). In another example, in a portion of these variations, the other sub-coding/coding unit mentioned in Step 912 is a motion-compensated sub-coding/coding unit. According to some of these variations, the motion vectors $\{v_k\}$ can be obtained from motion estimation.

Figure 4:
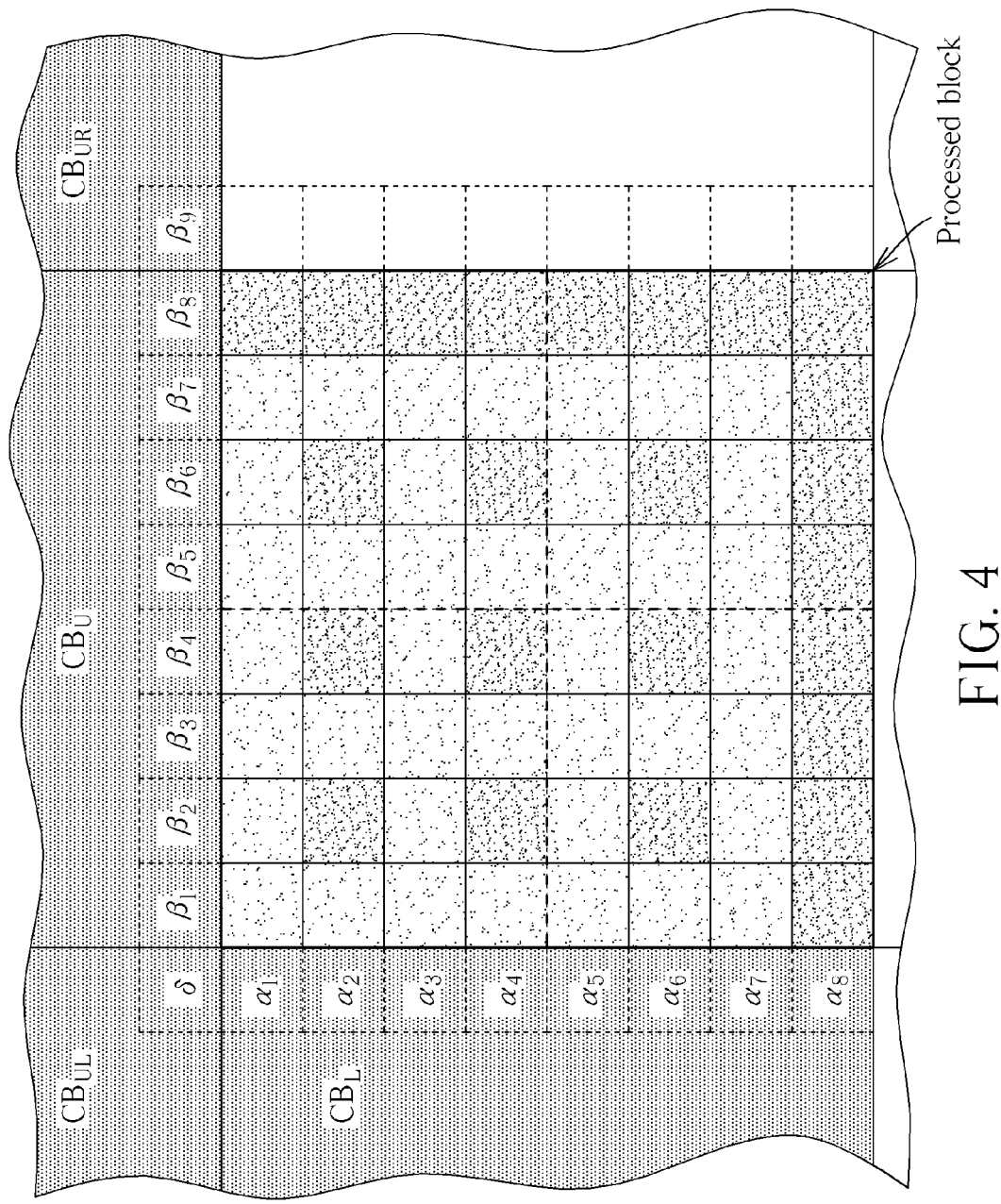
FIG. 4 illustrates some implementation details involved with the method shown in FIG. 2 according to an embodiment of the present invention.

FIG. 4 illustrates some implementation details involved with the method 910 shown in FIG. 2 according to an embodiment of the present invention. For better comprehension, the coded blocks $CB_L$, $CB_{UL}$, $CB_U$, and $CB_{UR}$ can be the same as those shown in FIG. 3, respectively. Referring to FIG. 4, the sub-coding units $\alpha_1$, $\alpha_2$, $\alpha_3$, $\alpha_4$, $\alpha_5$, $\alpha_6$, $\alpha_7$, and $\alpha_8$ belong to the left coded block $CB_L$, the sub-coding units $\beta_1$, $\beta_2$, $\beta_3$, $\beta_4$, $\beta_5$, $\beta_6$, $\beta_7$, and $\beta_8$ belong to the upper coded block $CB_U$, and the sub-coding units $\beta_9$ and $\delta$ belong to the upper right coded block $CB_{UR}$ and the upper left coded block $CB_{UL}$, respectively.

In this embodiment, the other sub-coding/coding unit mentioned in Step 912 may comprise one or more sub-coding units of one or more other coding units, such as one or more of the sub-coding units $\{\alpha_1, \alpha_2, \alpha_3, \alpha_4, \alpha_5, \alpha_6, \alpha_7, \alpha_8, \beta_1, \beta_2, \beta_3, \beta_4, \beta_5, \beta_6, \beta_7, \beta_8, \beta_9, \delta\}$, and may further comprise the remaining portion of the sub-coding units $\{SCU(t_0)\}$, such as those darkly shaded sub-blocks within the block under processing (labeled "Processed block" in FIG. 4), where the portion of the sub-coding units $\{SCU(t_0)\}$ mentioned in Step 912 can be those lightly shaded sub-blocks within the block under processing. More particularly, the plurality of motion vectors $\{v_k\}$ mentioned in Step 912 may comprise at least one motion vector (e.g. one or more motion vectors) of the remaining portion of the sub-coding units $\{SCU(t_0)\}$, where the aforementioned at least one motion vector is typically derived before the plurality of motion vectors $\{v_k\}$ is derived. In practice, the aforementioned at least one motion vector (e.g. one or more motion vectors) can be estimated first.

For brevity, sub-coding units within the remaining portion of the sub-coding units $\{SCU(t_0)\}$ can be referred to as the remaining sub-coding units (or the remaining sub-blocks, in a situation where each coding unit is a block), and sub-coding units within the portion of the sub-coding units $\{SCU(t_0)\}$ mentioned in Step 912 can be referred to as the MHP (which means multihypothesis prediction) direct sub-coding units (or the MHP direct sub-blocks, in a situation where each coding unit is a block) since the motion vectors for multihypothesis motion compensation of each MHP direct sub-coding unit such as the specific sub-coding unit $SCU(t_0)$ are directly derived from others (e.g. from the other sub-coding/coding unit mentioned above). In addition, the aforementioned portion comprising the MHP direct sub-coding units (or the MHP direct sub-blocks, in a situation where each coding unit is a block) can be referred to as the MHP direct portion.

Figure 5A:
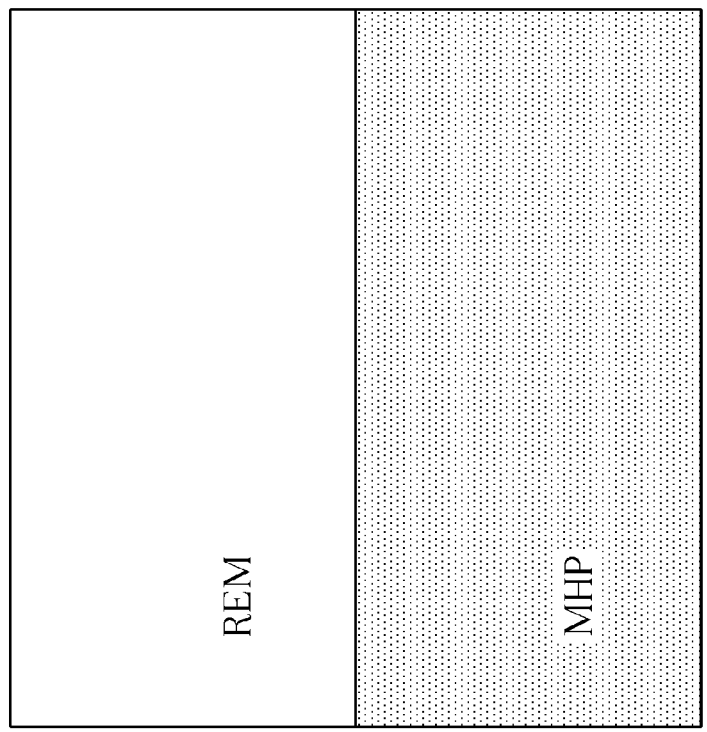
FIGS. 5A-5B illustrate exemplary types of hybrid multihypothesis prediction that are involved with the method shown in FIG. 2 according to different embodiments of the present invention.
Figure 5A:
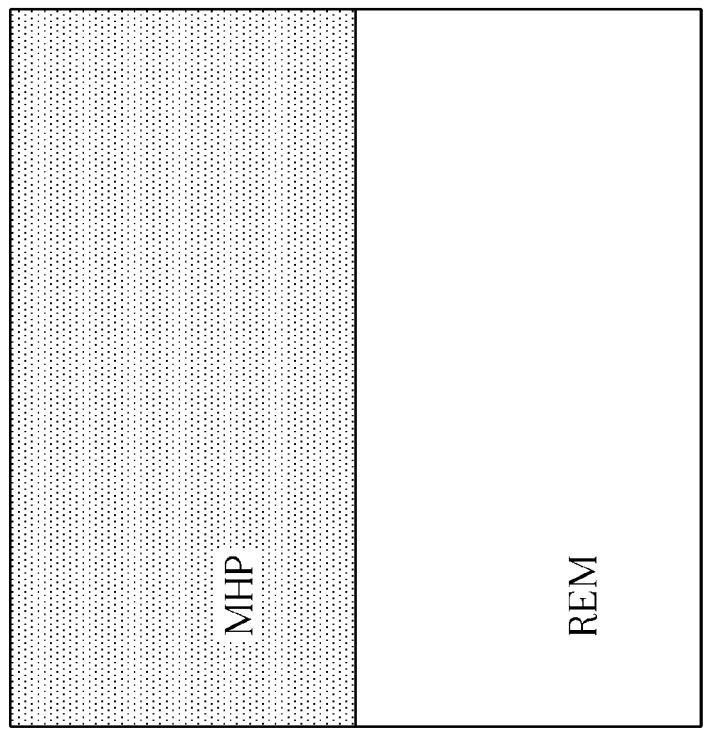
Figure 5B:
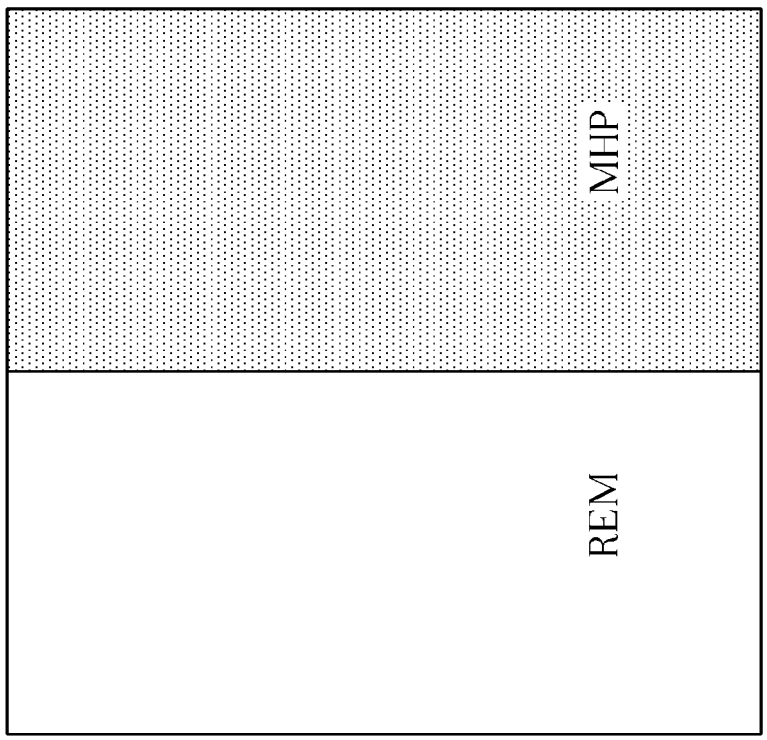
Figure 5B:
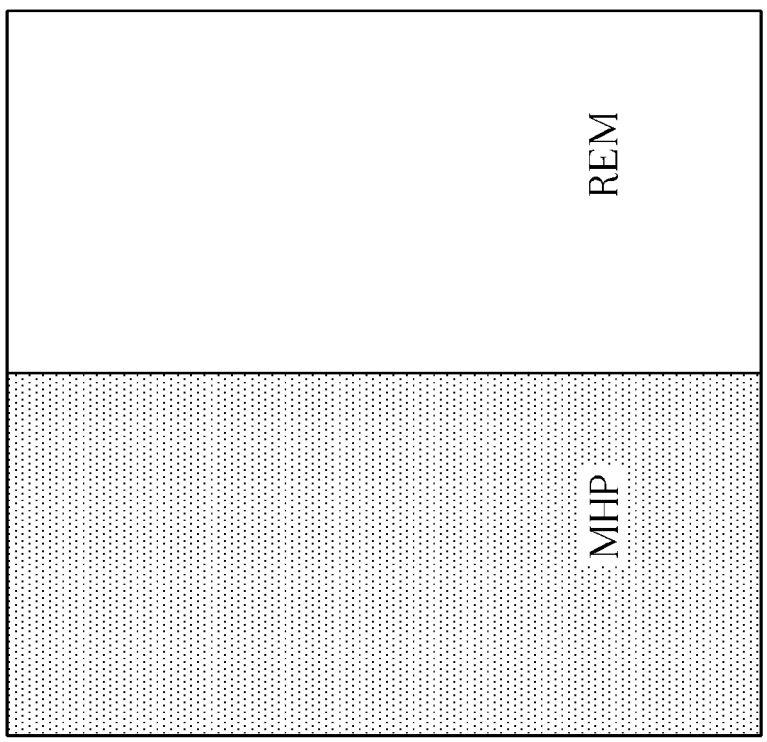

FIGS. 5A-5B illustrate exemplary types of hybrid multihypothesis prediction that are involved with the method 910 shown in FIG. 2 according to different embodiments of the present invention. In these embodiments, the preprocessing module can dynamically determine internal/external arrangement of the portion of the sub-coding units $\{SCU(t_0)\}$ mentioned in Step 912 (i.e. the MHP direct portion). More particularly, the preprocessing module can determine the distribution of the portion of the sub-coding units $\{SCU(t_0)\}$ among other portion(s) of the sub-coding units $\{SCU(t_0)\}$ based on a predetermined pattern, an implicit flag, or an explicit flag. That is, the preprocessing module can determine the distribution/arrangement of the MHP direct portion and the remaining portion within the coding unit $CU(t_0)$. For example, suppose that the aforementioned types of hybrid multihypothesis prediction comprise a top type, a bottom type, a left type, and a right type. The distribution/arrangement shown in the left half and the right half of FIG. 5A may respectively correspond to the top type and the bottom type, and the distribution/arrangement shown in the left half and the right half of FIG. 5B may respectively correspond to the left type and the right type, where the MHP direct portion and the remaining portion are respectively labeled "MHP" and "REM" in each of these embodiments for better comprehension.

The preprocessing module may derive an implicit flag for determining the distribution of the MHP direct portion from a bitstream carrying the coding unit, motion vectors of coded sub-coding/coding units, a motion vector variance of the coded sub-coding/coding units, a quantization parameter (QP) value, a bit-rate, a reconstructed residual signal of the coded sub-coding/coding units, a transmitted discrete cosine transform (DCT) coefficient, a motion partition type, a block size, statistical data, or any combination of the above.

Figure 5C:
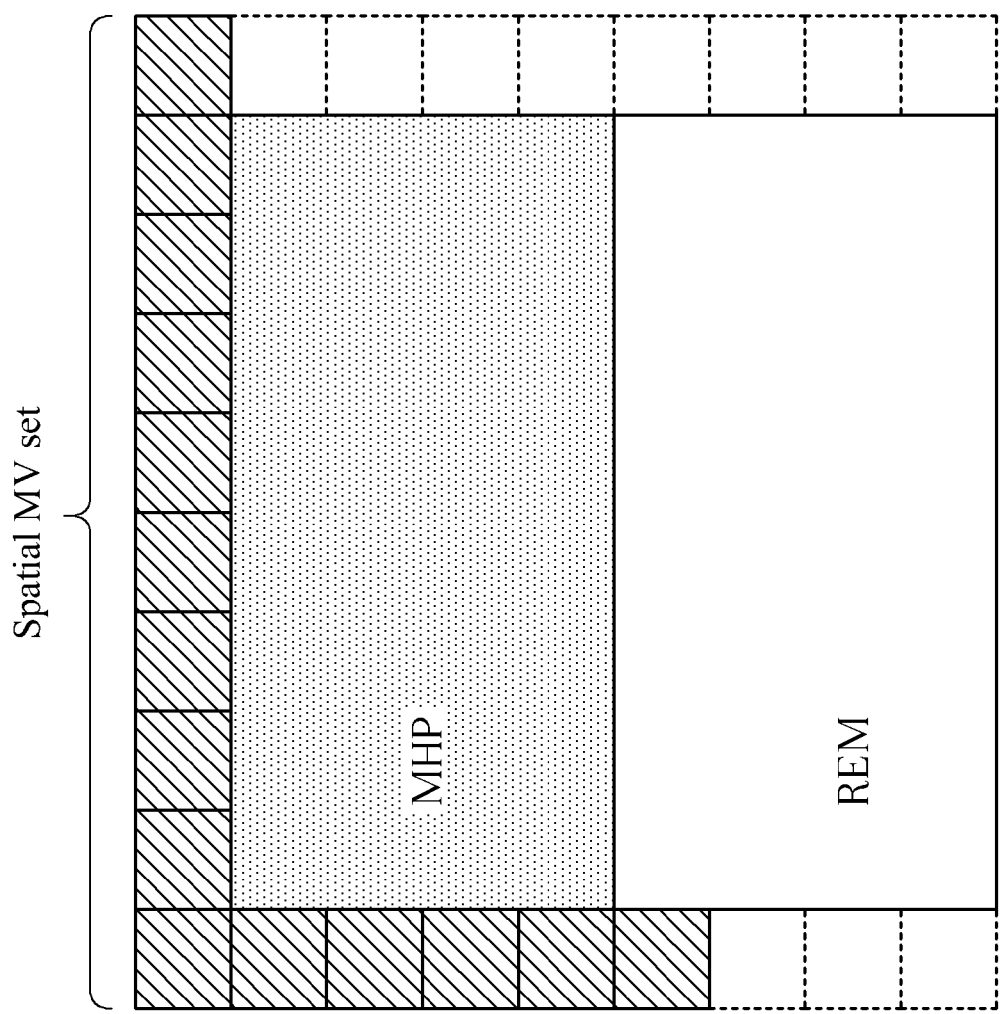
FIG. 5C illustrates some implementation details involved with the method shown in FIG. 2 according to an embodiment of the present invention.

In some embodiments, such as that shown in FIG. 5C, a coding unit can be divided into only two portions such as the upper portion and the lower portion within the coding unit shown in FIG. 5C, i.e. the MHP direct portion labeled "MHP" and the remaining portion labeled "REM" in this embodiment, respectively. Regarding the motion vector derivation of the upper portion, the preprocessing module can derive at least one motion vector from at least one other sub-coding/coding unit, such as one or more sub-coding units of at least one other coding unit (e.g. the shaded sub-coding units shown in FIG. 5C, where the motion vectors thereof form a spatial motion vector set, which is labeled "Spatial MV set") and one or more collocated sub-coding units corresponding to the upper portion, or derive at least one motion vector from one or more other sub-coding/coding units indicated by at least one explicit flag. For example, in a situation where the preprocessing module derives at least one motion vector from one or more other sub-coding/coding units indicated by at least one explicit flag, when the explicit flag indicates that the sub-coding unit in the upper left coded block $CB_{UL}$ is the source of motion vector(s) to be derived, the preprocessing module derives one or two motion vectors from this sub-coding unit in the upper left coded block $CB_{UL}$. In this embodiment, if this sub-coding unit is bi-predictive, there are two motion vectors available (more particularly, a motion vector of list 0 and a motion vector of list 1); otherwise (i.e. this sub-coding unit is not bi-predictive), there is only one motion vector available. No matter whether there are two motion vectors available or there is only one motion vector available, the preprocessing module can utilize the aforementioned one or two motion vectors of this sub-coding unit as motion vector(s) of the upper portion. This is for illustrative purposes only, and is not meant to be a limitation of the present invention. According to some variations of these embodiments, the preprocessing module can calculate a motion vector of the upper portion by utilizing a linear combination of the two motion vectors mentioned above.

Figure 6:
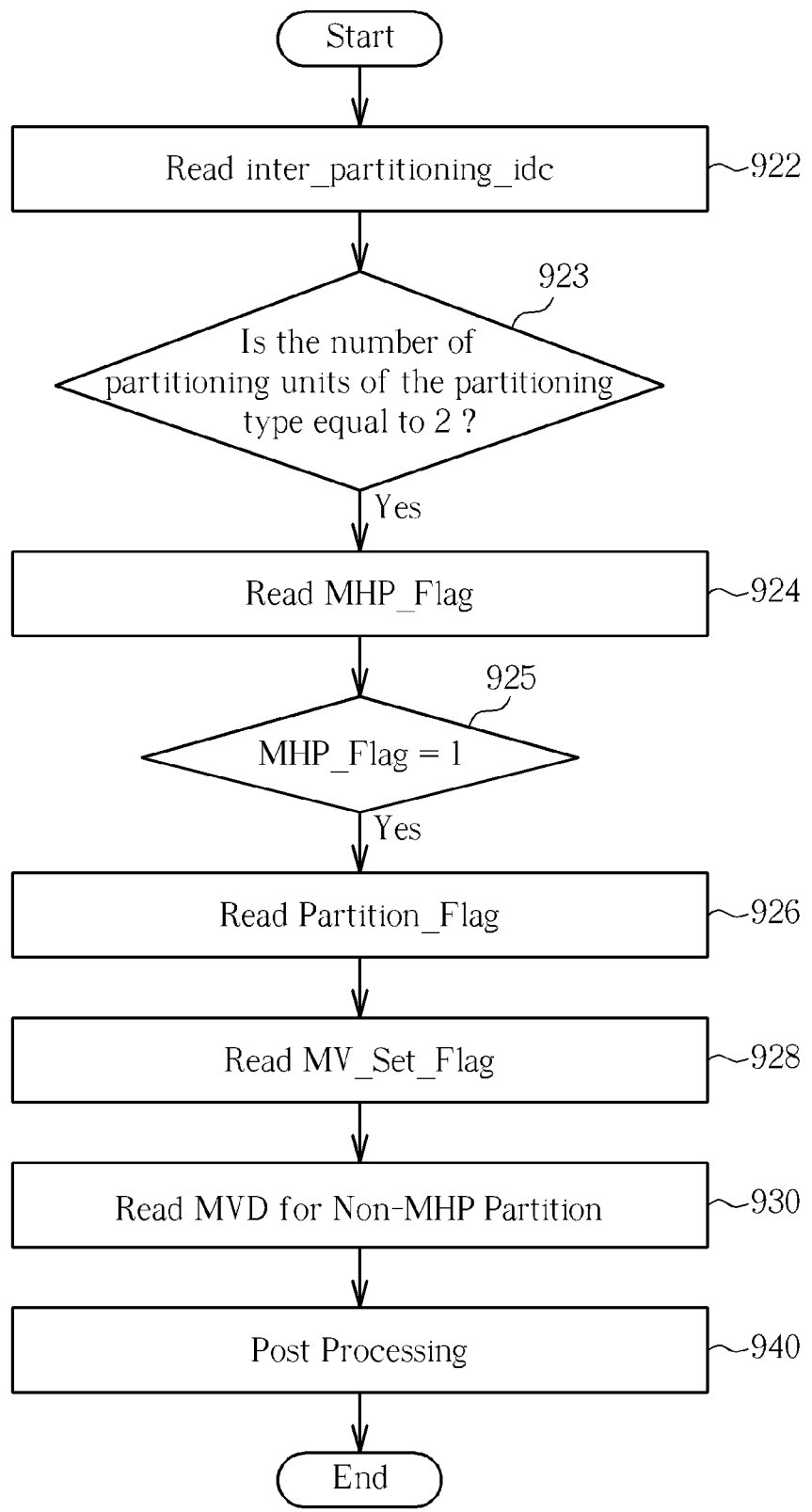
FIG. 6 is a flowchart of a decoding process involved with the method shown in FIG. 2 according to an embodiment of the present invention.

FIG. 6 is a flowchart of a decoding process involved with the method 910 shown in FIG. 2 according to an embodiment of the present invention. The decoding process is described as follows.

In Step 922, the aforementioned preprocessing module reads a parameter inter_partitioning_idc, where the parameter inter_partitioning_idc means the partitioning type.

In Step 923, the preprocessing module checks whether the number of partitioning units of the partitioning type mentioned in Step 922 is equal to 2. When the number of partitioning units of that partitioning type is equal to 2, Step 924 is entered; otherwise, a certain step which is not illustrated (for simplicity) is entered.

In Step 924, the preprocessing module reads a flag MHP_Flag, where the flag MHP_Flag indicates whether to perform multihypothesis prediction.

In Step 925, the preprocessing module checks whether the flag MHP_Flag is equal to 1. When the flag MHP_Flag is equal to 1, Step 925 is entered; otherwise, a certain step which is not illustrated (for simplicity) is entered.

In Step 926, the preprocessing module reads a flag Partition Flag, where the flag MHP_Flag indicates a partition type, such as one of the types disclosed in the embodiments shown in FIGS. 5A-5B.

In Step 928, the preprocessing module reads a flag MV_Set_Flag, where the flag MV_Set_Flag indicates a specific motion vector set (or a specific set of motion vectors) to be selected from a plurality of motion vector sets (or a plurality of sets of motion vectors).

In Step 930, the preprocessing module reads the MVD(s) (which means motion vector difference(s)) for non-MHP partition(s) such as the remaining portion mentioned above. For example, the MVD(s) can be difference(s) between original motion vector(s) and motion vector predictor(s), for purposes of decreasing transmission bandwidth. In another example, the MVD(s) can be difference(s) between a current motion vector and previous motion vector(s).

In Step 940, the preprocessing module performs post processing comprising some operations required for completing the decoding process.

Figure 7A:
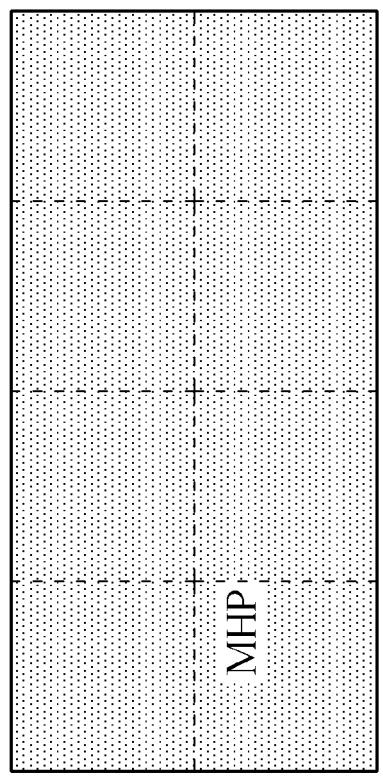
FIG. 7A illustrates exemplary partitions based on a transform size according to different embodiments of the present invention.
Figure 7A:
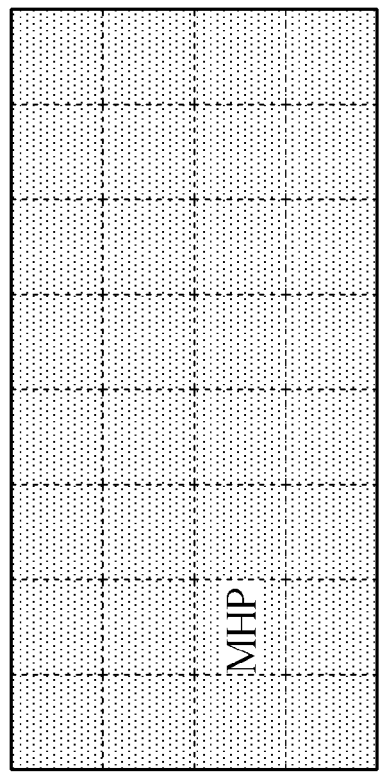

FIG. 7A illustrates exemplary partitions based on a transform size according to different embodiments of the present invention. As mentioned, the preprocessing module can dynamically determine internal/external arrangement of the portion of the sub-coding units {SCU($t_0$)} mentioned in Step 912 (i.e. the MHP direct portion). More particularly, in this embodiment, the preprocessing module can determine the size of the specific sub-coding unit SCU($t_0$) to be a transform size regarding video coding of the coding unit CU($t_0$), and more particularly, determine the size of each sub-coding unit of the portion of the sub-coding units {SCU($t_0$)} (i.e. the size of each of the MHP direct sub-coding units) to be the transform size regarding video coding of the coding unit CU($t_0$) (e.g. 4 by 4, 8 by 8, and so on).

Figure 7B:
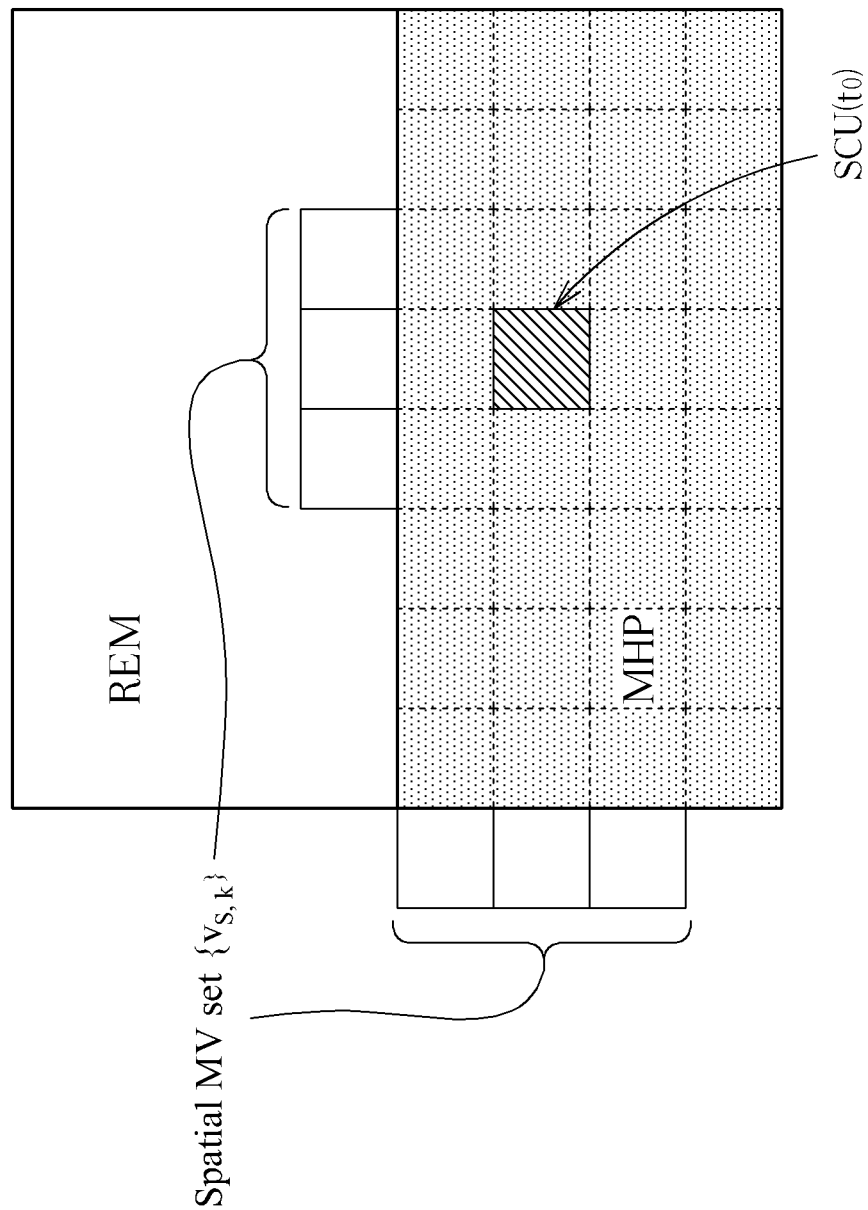
FIGS. 7B-7D illustrate exemplary sources for obtaining motion vectors that are involved with the method shown in FIG. 2 according to some embodiments of the present invention.
Figure 7C:
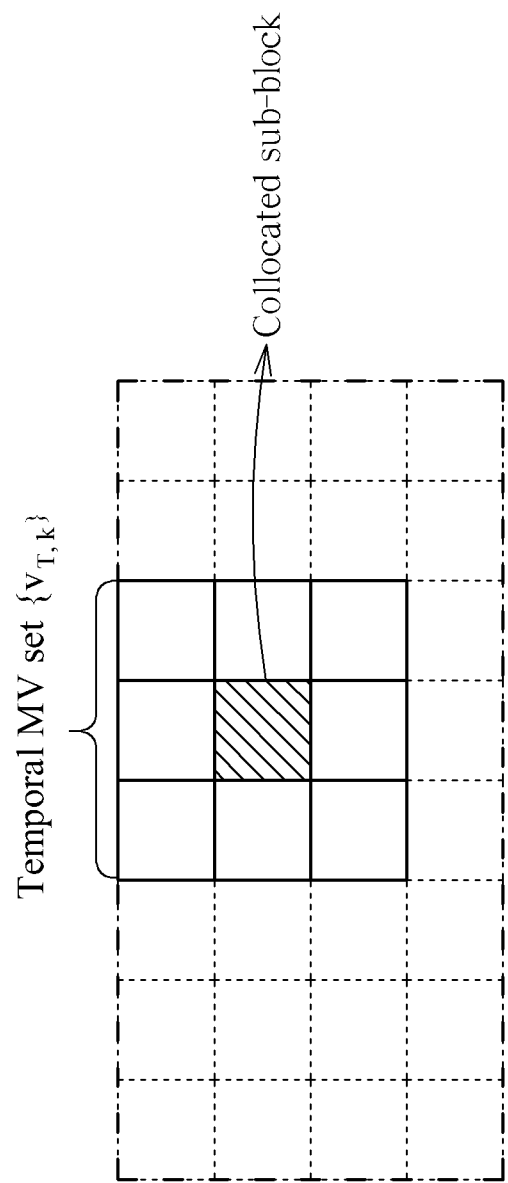
Figure 7D:
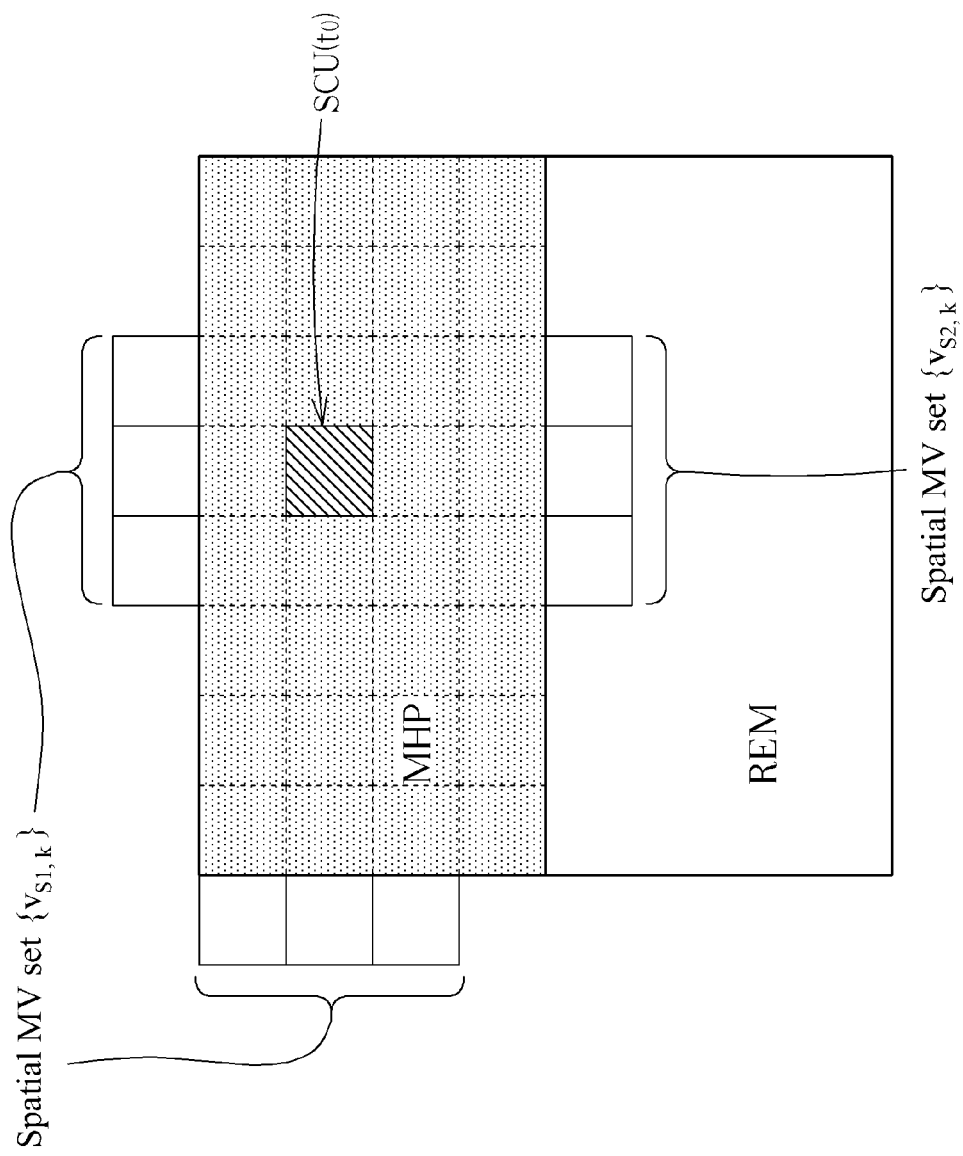

FIGS. 7B-7D illustrate exemplary sources for obtaining motion vectors that are involved with the method 910 shown in FIG. 2 according to some embodiments of the present invention. In these embodiments, the preprocessing module can select the specific motion vector set from the plurality of motion vector sets according to the flag MV_Set_Flag mentioned in Step 928, where the plurality of motion vector sets may comprise at least one spatial motion vector set (e.g. one or more sets of spatial motion vectors) and/or at least one temporal motion vector set (e.g. one or more sets of temporal motion vectors).

Referring to FIG. 7B, the aforementioned at least one spatial motion vector set may comprise the spatial motion vector set $\{v_{S,k}\}$ (labeled "Spatial MV set $\{v_{S,k}\}$"), where the spatial motion vector set $\{v_{S,k}\}$ may comprise the respective motion vectors of some of the closest sub-coding units within the left coded block $CB_L$ with regard to the specific sub-coding unit SCU($t_0$), and may further comprise the respective motion vectors of some of the closest sub-coding units within the remaining portion (labeled "REM") with regard to the specific sub-coding unit SCU($t_0$).

Referring to FIG. 7C, the aforementioned at least one temporal motion vector set may comprise the temporal motion vector set $\{v_{T,k}\}$ (labeled "Temporal MV set $\{v_{T,k}\}$"), where the temporal motion vector set $\{v_{T,k}\}$ may comprise the motion vector(s) of a collocated sub-coding unit (e.g. the collocated sub-block shown in FIG. 7C) with regard to the specific sub-coding unit SCU($t_0$), and may further comprise the respective motion vectors of some adjacent/neighboring sub-coding units of the collocated sub-coding unit. For example, the temporal motion vector set may comprise list 0 motion vector and list 1 motion vector of a collocated sub-coding unit.

Referring to FIG. 7D, the aforementioned at least one spatial motion vector set may comprise the spatial motion vector set $\{v_{S1,k}\}$ (labeled "Spatial MV set $\{v_{S1,k}\}$") and the spatial motion vector set $\{v_{S2,k}\}$ (labeled "Spatial MV set $\{v_{S2,k}\}$"). In this embodiment, the spatial motion vector set $\{v_{S1,k}\}$ may comprise the respective motion vectors of one or more closest sub-coding units within the left coded block $CB_L$ with regard to the specific sub-coding unit SCU($t_0$), and may further comprise the respective motion vectors of one or more closest sub-coding units within the upper coded block $CB_U$ with regard to the specific sub-coding unit SCU($t_0$). In addition, the spatial motion vector set $\{v_{S2,k}\}$ may comprise the respective motion vectors of one or more closest sub-coding units within the remaining portion (labeled "REM") with regard to the specific sub-coding unit SCU($t_0$).

Figure 8B:
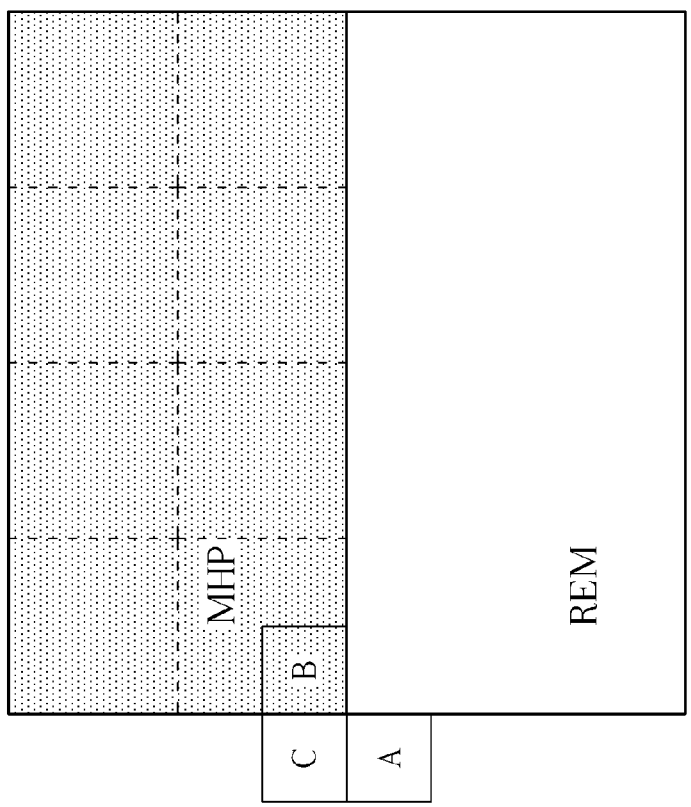
Figure 8B:
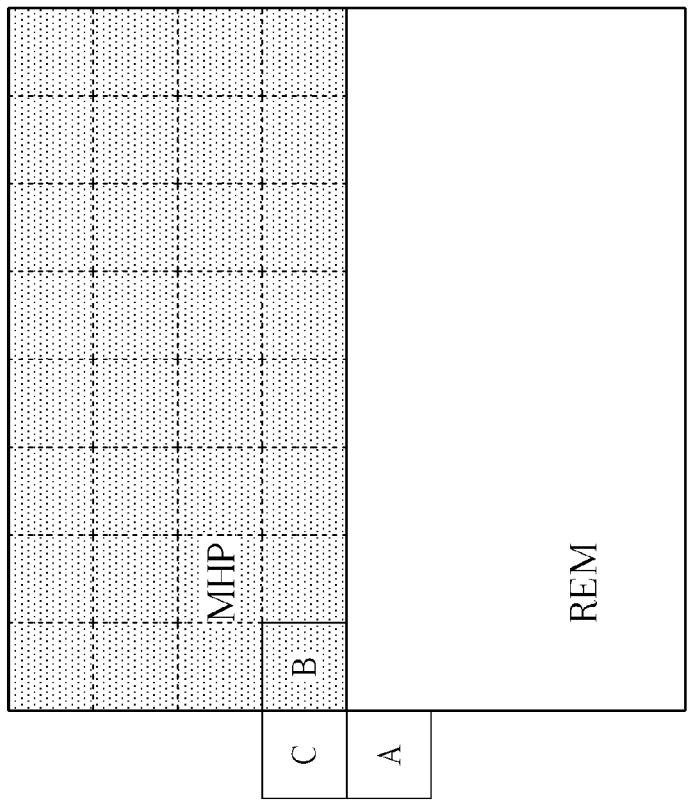

FIGS. 8A-8B illustrate exemplary sources for obtaining at least one motion vector of the remaining portion (labeled "REM") according to some embodiments of the present invention. For example, the motion vector of the remaining portion can be derived by utilizing some related art methods such as those complying with H.264 specifications, based upon the motion vectors $v_A$, $v_B$, and $v_C$ of the sub-coding units A, B, and C illustrated in FIG. 8A. In some other examples, the motion vector of the remaining portion can be derived by utilizing some related art methods such as those complying with H.264 specifications, based upon the motion vectors $v_A$, $v_B$, and $v_C$ of the sub-coding units A, B, and C illustrated in any of the left half and the right half of FIG. 8B.

Figure 9A:
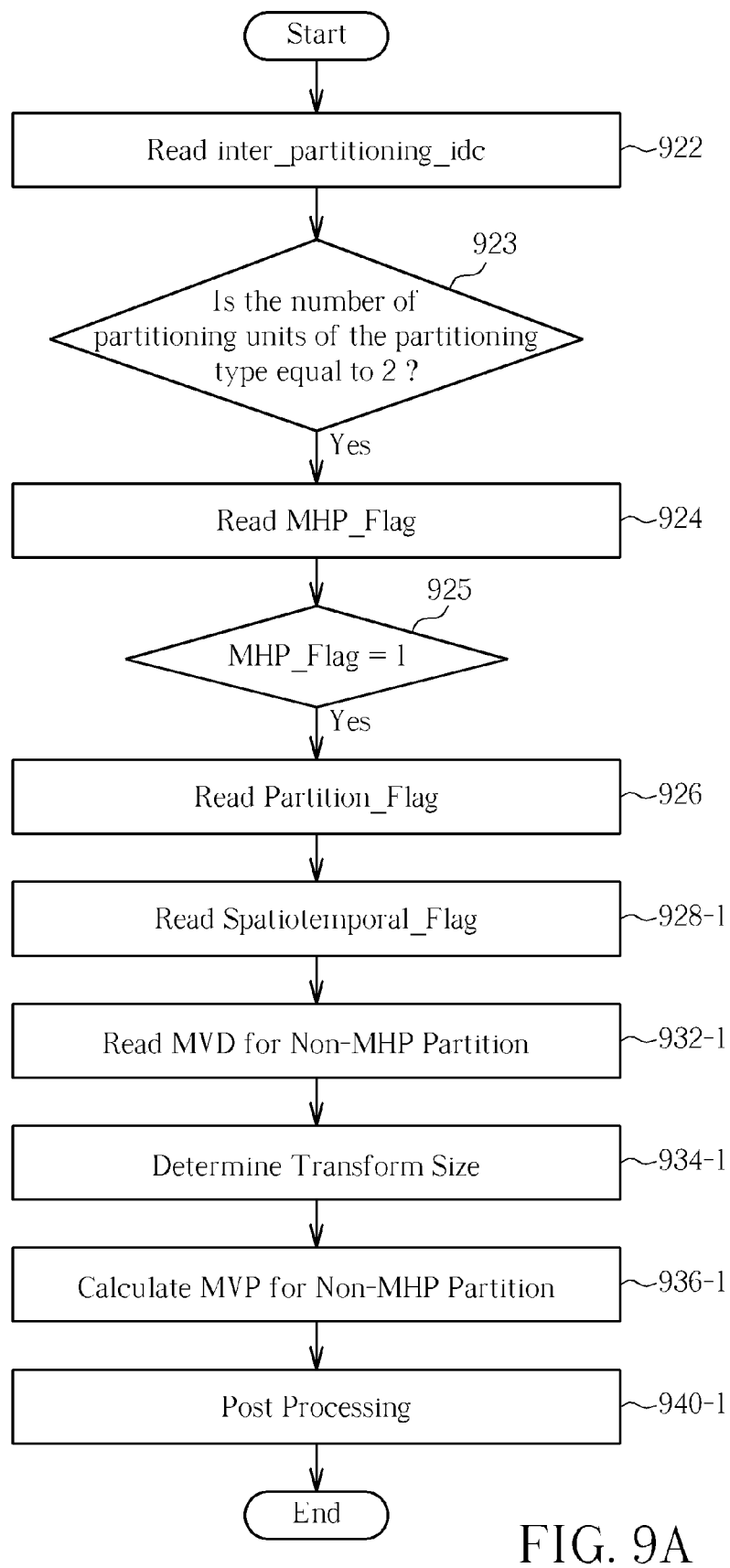
FIGS. 9A-9C illustrate respective flowcharts of some decoding processes involved with the method shown in FIG. 2 according to different embodiments of the present invention.
Figure 9B:
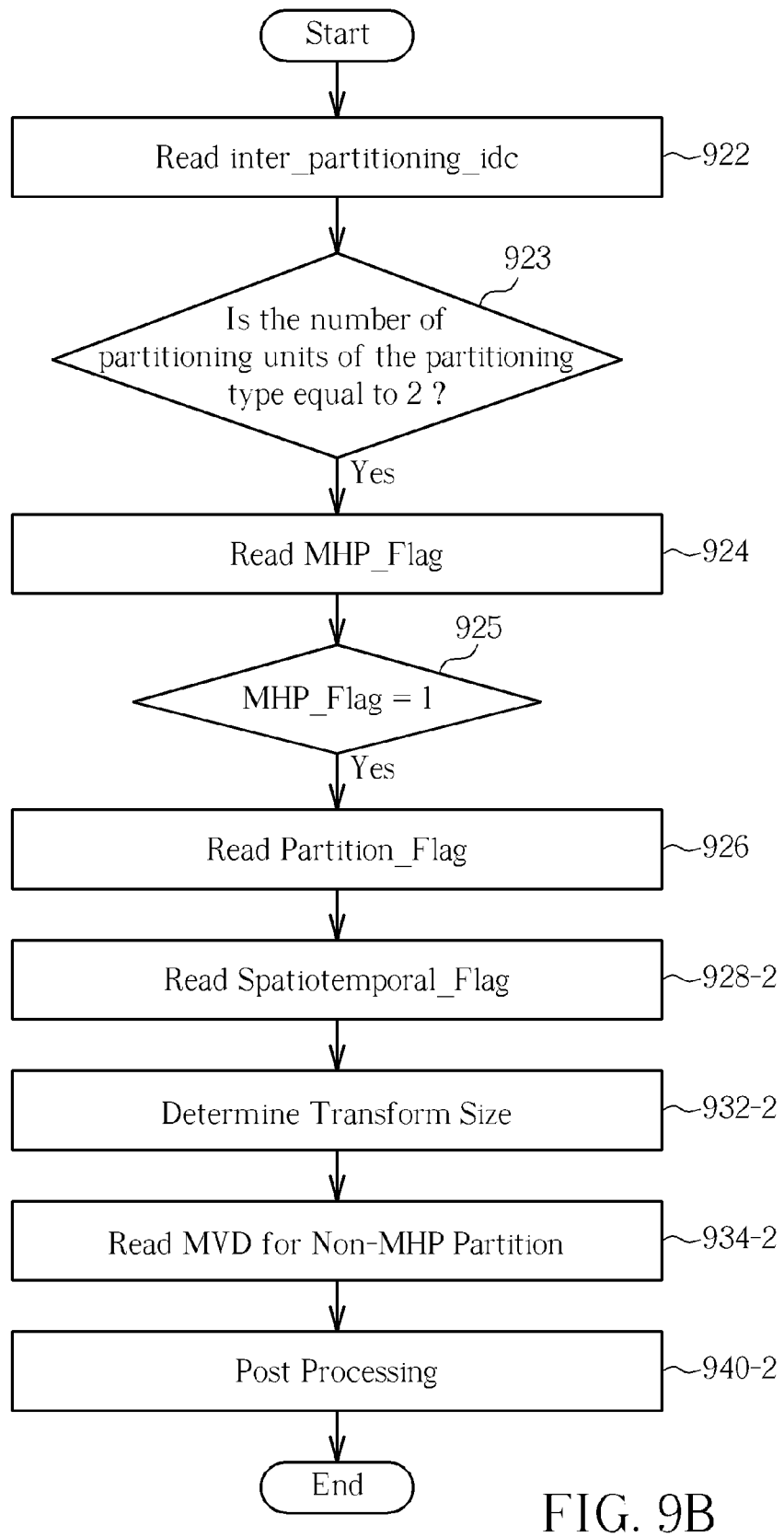
Figure 9C:
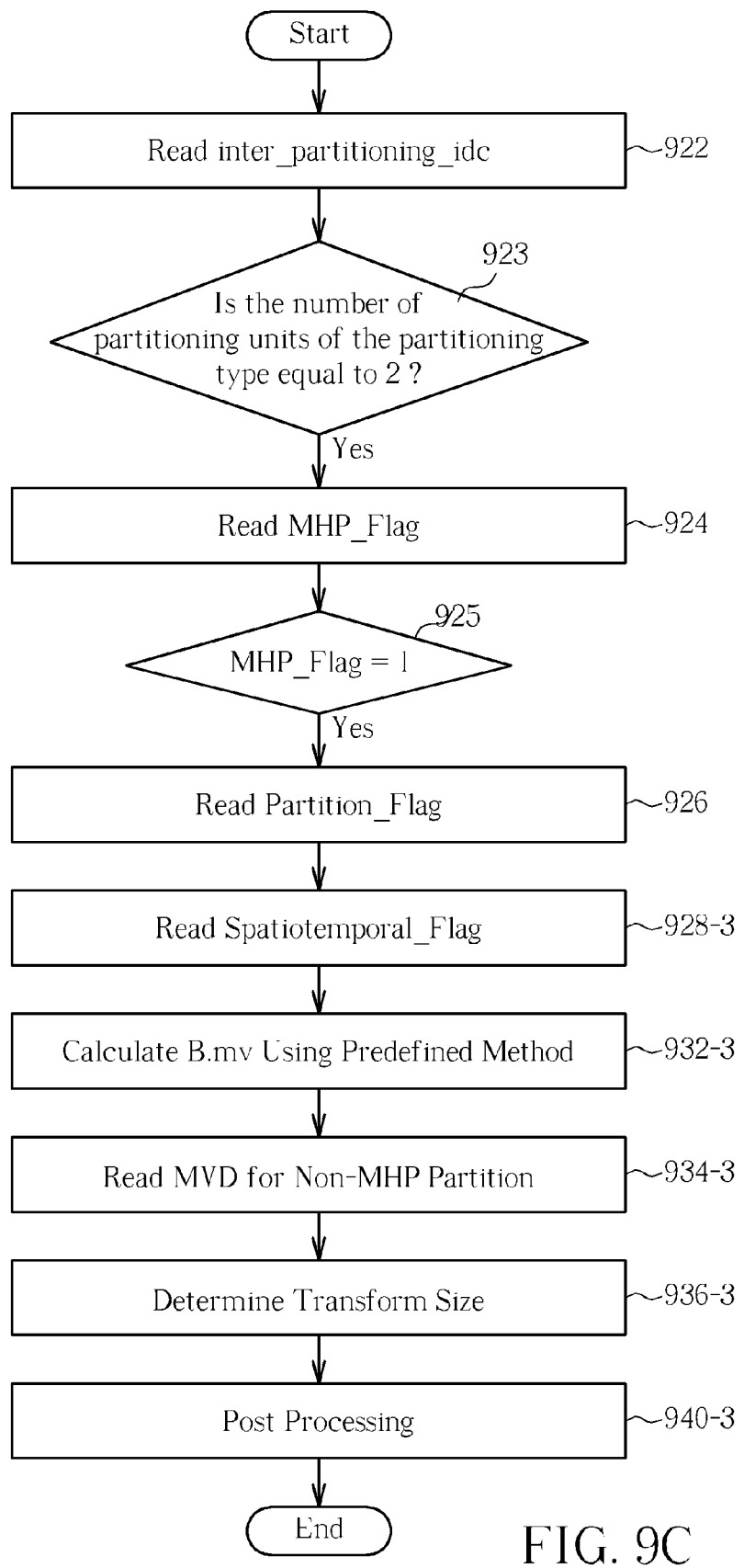

FIGS. 9A-9C illustrate respective flowcharts of some decoding processes involved with the method 910 shown in FIG. 2 according to different embodiments of the present invention. In these embodiments, Steps 922, 923, 924, 925, and 926 are the same as those of the embodiment shown in FIG. 6, and Step 940-1, 940-2, and 940-3 may be the same as or similar to Step 940 of the embodiment shown in FIG. 6. The remaining steps of these decoding processes are described as follows.

Referring to FIG. 9A, in Step 928-1, the preprocessing module reads a flag Spatiotemporal_Flag, where the flag Spatiotemporal_Flag indicates spatial/temporal motion vector set configurations, such as configurations for selecting one or more motion vector sets from the aforementioned at least one spatial motion vector set (e.g. one or more sets of spatial motion vectors) and the aforementioned at least one temporal motion vector set (e.g. one or more sets of temporal motion vectors).

In Step 932-1, the preprocessing module reads the MVD(s) (which means motion vector difference(s)) for non-MHP partition(s) such as the remaining portion mentioned above. For example, the MVD(s) can be difference(s) between original motion vector(s) and motion vector predictor(s), for purposes of decreasing transmission bandwidth. In another example, the MVD(s) can be difference(s) between a current motion vector and previous motion vector(s).

In Step 934-1, the preprocessing module determines the transform size mentioned above.

In Step 936-1, the preprocessing module calculates MVP(s) (which means motion vector predictor(s)) for non-MHP partition(s) such as the remaining portion mentioned above.

Referring to FIG. 9B, in Step 928-2, the preprocessing module reads a flag Spatiotemporal_Flag, where the flag Spatiotemporal_Flag indicates spatial/temporal motion vector set configurations, such as configurations for selecting one or more motion vector sets from the aforementioned at least one spatial motion vector set (e.g. one or more sets of spatial motion vectors) and the aforementioned at least one temporal motion vector set (e.g. one or more sets of temporal motion vectors).

In Step 932-2, the preprocessing module determines the transform size mentioned above.

In Step 934-2, the preprocessing module reads the MVD(s) (which means motion vector difference(s)) for non-MHP partition(s) such as the remaining portion mentioned above. For example, the MVD(s) can be difference(s) between original motion vector(s) and motion vector offset(s), for purposes of decreasing transmission bandwidth.

Referring to FIG. 9C, in Step 928-3, the preprocessing module reads a flag Spatiotemporal_Flag, where the flag Spatiotemporal_Flag indicates spatial/temporal motion vector set configurations, such as configurations for selecting one or more motion vector sets from the aforementioned at least one spatial motion vector set (e.g. one or more sets of spatial motion vectors) and the aforementioned at least one temporal motion vector set (e.g. one or more sets of temporal motion vectors).

In Step 932-3, the preprocessing module calculate B.mv using a predefined method, where the notation B.mv may represent the motion vector of the sub-coding unit B for calculating the remaining portion of the embodiment shown in FIG. 8A.

In Step 934-3, the preprocessing module reads MVD(s) (which means motion vector difference(s)) for non-MHP partition(s) such as the remaining portion mentioned above.

In Step 936-3, the preprocessing module determines the transform size mentioned above.

It is an advantage of the present invention that the encoders and decoders can properly perform hybrid multihypothesis prediction, and more particularly, can properly perform multihypothesis motion compensation on the sub-coding unit(s) of the MHP direct portion within the coding unit under consideration with ease, while the remaining portion can be processed according to the related art methods such as those complying with H.264 specifications. As a result of utilizing the present invention method and apparatus, both the motion vector prediction operations and the multihypothesis motion compensation operations can be performed without introducing any related art problem such as low coding efficiency.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing hybrid multihypothesis prediction during video coding of a coding unit, the method comprising:
  processing a plurality of sub-coding units in the coding unit;
  performing motion vector derivation of a portion of the sub-coding units, wherein the step of performing motion vector derivation of the portion of the sub-coding units further comprises:
    deriving a plurality of motion vectors for multihypothesis motion-compensated prediction of a specific sub-coding unit of the portion of the sub-coding units, at least one of motion vectors is the motion vector of one other sub-coding/coding unit, and the one other sub-coding/coding unit is coded before the corresponding motion vector is derived for multihypothesis motion-compensated prediction of the specific sub-coding unit; and
  performing multihypothesis motion-compensated prediction on the specific sub-coding unit according to the plurality of motion vectors, wherein the step of performing multihypothesis motion-compensated prediction on the specific sub-coding unit according to the plurality of motion vectors further comprises:
    utilizing a linear combination of a plurality of pixel values derived from the plurality of motion vectors as a predicted pixel value of the specific sub-coding unit.

2. The method of claim 1, wherein the step of performing multihypothesis motion-compensated prediction on the specific sub-coding unit according to the plurality of motion vectors further comprises:
  calculating a weighted summation of the plurality of pixel values to derive the predicted pixel value of the specific sub-coding unit.

3. The method of claim 1, wherein the step of performing multihypothesis motion-compensated prediction on the specific sub-coding unit according to the plurality of motion vectors further comprises:
  calculating an average of the plurality of pixel values to derive the predicted pixel value of the specific sub-coding unit.

4. The method of claim 1, wherein the step of performing motion vector derivation of the portion of the sub-coding units further comprises:
  performing motion vector derivation of the portion of the sub-coding units based on an explicit flag.

5. The method of claim 1, wherein the plurality of motion vectors is derived from a remaining portion of the sub-coding units in the coding unit.

6. The method of claim 5, wherein motion vector prediction of the remaining portion of the sub-coding units is performed before performing multihypothesis motion-compensated prediction of the portion of the sub-coding units.

7. The method of claim 1, wherein the step of processing the plurality of sub-coding units in the coding unit further comprises:
  determining a size of the specific sub-coding unit to be a transform size regarding video coding of the coding unit.

8. The method of claim 1, wherein the step of processing the plurality of sub-coding units in the coding unit further comprises:
  based on a predetermined pattern, an implicit flag, or an explicit flag, determining distribution of the portion of the sub-coding units for performing multihypothesis motion-compensated prediction.

9. The method of claim 8, wherein the implicit flag is derived from one or a combination of a bitstream carrying the coding unit, motion vectors of coded sub-coding/coding units, a motion vector variance of the coded sub-coding/coding units, a quantization parameter (QP) value, a bit-rate, a reconstructed residual signal of the coded sub-coding/coding units, a transmitted discrete cosine transform (DCT) coefficient, a motion partition type, a block size, and statistical data.

10. The method of claim 1, wherein the at least one other sub-coding/coding unit is a coded sub-coding/coding unit.

11. The method of claim 10, wherein the at least one other sub-coding/coding unit comprises at least one spatially coded sub-coding/coding unit and/or at least one temporally coded sub-coding/coding unit.

12. The method of claim 1, wherein the at least one other sub-coding/coding unit is a motion-compensated sub-coding/coding unit.

13. The method of claim 1, wherein the at least one other sub-coding unit/coding unit is a sub-coding unit in a neighboring coding unit.

14. The method of claim 1, wherein the plurality of motion vectors are derived from a single sub-coding unit/coding unit.

15. An apparatus for performing hybrid multihypothesis prediction during video coding of a coding unit, the apparatus comprising:
  a processing circuit arranged to perform video coding on the coding unit, wherein the processing circuit comprises:

a preprocessing module arranged to process a plurality of sub-coding units in the coding unit and perform motion vector derivation of a portion of the sub-coding units, wherein the preprocessing module derives a plurality of motion vectors for multihypothesis motion-compensated prediction of a specific sub-coding unit of the portion of the sub-coding units, wherein at least one of motion vectors is the motion vector of one other sub-coding/coding unit and the one other sub-coding/coding unit is coded before the corresponding motion vector is derived for multihypothesis motion-compensated prediction of the specific sub-coding unit, and performs multihypothesis motion-compensated prediction on the specific sub-coding unit according to the plurality of motion vectors, and the preprocessing module utilizes a linear combination of a plurality of pixel values derived from the plurality of motion vectors as a predicted pixel value of the specific sub-coding unit; and at least one coding module arranged to perform video coding on the coding unit based upon the multihypothesis motion-compensated prediction performed by the preprocessing module.

16. The apparatus of claim 15, wherein the preprocessing module calculates a weighted summation of the plurality of pixel values to derive the predicted pixel value of the specific sub-coding unit.

17. The apparatus of claim 15, wherein the preprocessing module calculates an average of the plurality of pixel values to derive the predicted pixel value of the specific sub-coding unit.

18. The apparatus of claim 15, wherein the preprocessing module performs motion vector derivation of the portion of the sub-coding units based on an explicit flag.

19. The apparatus of claim 15, wherein the preprocessing module derives the motion vectors from a remaining portion of the sub-coding units in the coding unit.

20. The apparatus of claim 19, wherein the preprocessing module performs motion vector prediction on the remaining portion of the sub-coding units before performing multihypothesis motion-compensated prediction on the portion of the sub-coding units.

21. The apparatus of claim 15, wherein the preprocessing module determines a size of the specific sub-coding unit to be a transform size regarding video coding of the coding unit.

22. The apparatus of claim 15, wherein based on a predetermined pattern, an implicit flag, or an explicit flag, the preprocessing module determines distribution of the portion of the sub-coding units for performing multihypothesis motion-compensated prediction.

23. The apparatus of claim 22, wherein the implicit flag is derived from one or a combination of a bitstream carrying the coding unit, motion vectors of coded sub-coding/coding units, a motion vector variance of the coded sub-coding/coding units, a quantization parameter (QP) value, a bit-rate, a reconstructed residual signal of the coded sub-coding/coding units, a transmitted discrete cosine transform (DCT) coefficient, a motion partition type, a block size, and statistical data.

24. The apparatus of claim 15, wherein the at least one other sub-coding/coding unit is a coded sub-coding/coding unit.

25. The apparatus of claim 24, wherein the at least one other sub-coding/coding unit comprises at least one spatially coded sub-coding/coding unit and/or at least one temporally coded sub-coding/coding unit.

26. The apparatus of claim 15, wherein the at least one other sub-coding/coding unit is a motion-compensated sub-coding/coding unit.

27. The apparatus of claim 15, wherein the at least one other sub-coding unit/coding unit is a sub-coding unit in a neighboring coding unit.

28. The apparatus of claim 15, wherein the plurality of motion vectors are derived from a single sub-coding unit/coding unit.

* * * * *